US012645080B2

(12) United States Patent (10) Patent No.: US 12,645,080 B2
Fujiki (45) Date of Patent: Jun. 2, 2026

(54) GLASSES-TYPE INFORMATION DISPLAY DEVICE, DISPLAY CONTROL METHOD, AND DISPLAY CONTROL PROGRAM

(71) Applicant: FUJIFILM Corporation, Tokyo (JP)

(72) Inventor: Shinichiro Fujiki, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 242 days.

(21) Appl. No.: 18/173,920

(22) Filed: Feb. 24, 2023

(65) Prior Publication Data

US 2023/0273441 A1 Aug. 31, 2023

(30) Foreign Application Priority Data

Feb. 28, 2022 (JP) .................................. 2022-030211

(51) Int. Cl.
*G02B 27/01* (2006.01)
(52) U.S. Cl.
CPC .. *G02B 27/0172* (2013.01); *G02B 2027/0178* (2013.01)
(58) Field of Classification Search
CPC ........ G02B 27/0172; G02B 2027/0178; G02B 2027/0134; G02B 2027/014; G02B 2027/0143; G02B 27/0012; G02B 27/0101; G02B 27/18; G02B 30/20; G02B 2027/0147; G03B 21/00; G03B 21/142; H04N 13/332; H04N 13/398
See application file for complete search history.

(56) References Cited

U.S. PATENT DOCUMENTS

| | | | |
|---|---|---|---|
| 2011/0164294 A1* | 7/2011 | Shimizu | G02B 27/0172 359/13 |
| 2012/0050508 A1* | 3/2012 | Lee | H04N 13/398 348/56 |
| 2015/0042679 A1 | 2/2015 | Järvenpää | |
| 2016/0320625 A1 | 11/2016 | Von Und Zu Liechtenstein | |
| 2017/0315357 A1 | 11/2017 | Katano et al. | |
| 2018/0197395 A1* | 7/2018 | Kuwana | G06F 3/017 |
| 2018/0322845 A1 | 11/2018 | Machida | |

(Continued)

FOREIGN PATENT DOCUMENTS

| | | |
|---|---|---|
| CA | 2 340 063 A1 | 2/2000 |
| CN | 112950791 A | 6/2021 |

(Continued)

OTHER PUBLICATIONS

Extended European Search Report for corresponding European Application No. 23158890.6, dated Aug. 3, 2023.

(Continued)

*Primary Examiner* — Xiao M Wu
*Assistant Examiner* — Latrell Anthony Creary
(74) *Attorney, Agent, or Firm* — Birch, Stewart, Kolasch & Birch, LLP

(57) ABSTRACT
A glasses-type information display device includes a first transmission unit and a second transmission unit, a projection unit that projects an image onto the first transmission unit, a visibility reduction unit that reduces visibility of a real image visually recognized by a user through the second transmission unit, and a processor that performs a control to cause the visibility reduction unit to reduce the visibility on the basis of a display priority given to the image.

15 Claims, 16 Drawing Sheets

(56) References Cited

U.S. PATENT DOCUMENTS

| | | | |
|---|---|---|---|
| 2021/0025731 A1* | 1/2021 | Fujishima | B65G 1/1373 |
| 2021/0035533 A1 | 2/2021 | Tanaka et al. | |
| 2021/0225053 A1 | 7/2021 | Aoki et al. | |
| 2021/0251717 A1 | 8/2021 | Healy et al. | |
| 2022/0107497 A1 | 4/2022 | Murata et al. | |
| 2022/0163802 A1* | 5/2022 | Mima | G02B 27/0172 |
| 2022/0230579 A1 | 7/2022 | Ato | |
| 2022/0404578 A1* | 12/2022 | Lee | G06T 7/50 |
| 2023/0120611 A1* | 4/2023 | Polchin | A61B 90/25 |
| | | | 348/47 |
| 2023/0176401 A1* | 6/2023 | Shin | G02B 3/14 |
| | | | 351/239 |

FOREIGN PATENT DOCUMENTS

| | | | |
|---|---|---|---|
| JP | 11-161188 A | 6/1999 | |
| JP | 2002-523002 A | 7/2002 | |
| JP | 2005-26819 A | 1/2005 | |
| JP | 2005-195822 A | 7/2005 | |
| JP | 2008-185609 A | 8/2008 | |
| JP | 2010-197911 A | 9/2010 | |
| JP | 2014-130204 A | 7/2014 | |
| JP | 2016-212147 A | 12/2016 | |
| JP | 2017-198825 A | 11/2017 | |
| JP | 2020-46976 A | 3/2020 | |
| JP | 2021-21889 A | 2/2021 | |
| JP | 2021-144258 A | 9/2021 | |
| WO | WO2020/059357 A1 | 3/2020 | |
| WO | WO2020/110580 A1 | 6/2020 | |
| WO | WO2020/230744 A1 | 11/2020 | |
| WO | WO2021/089111 A1 | 5/2021 | |

OTHER PUBLICATIONS

European Communication pursuant to Article 94(3) EPC for corresponding European Application No. 23 158 890.6, dated Mar. 28, 2025.

Japanese Office Action for corresponding Japanese Application No. 2022-030211, dated Sep. 2, 2025, with English translation.

Notice of Reasons for Refusal issued in Japanese Application No. 2022-030211 on Mar. 31, 2026, with English translation.

* cited by examiner

Figure 1:
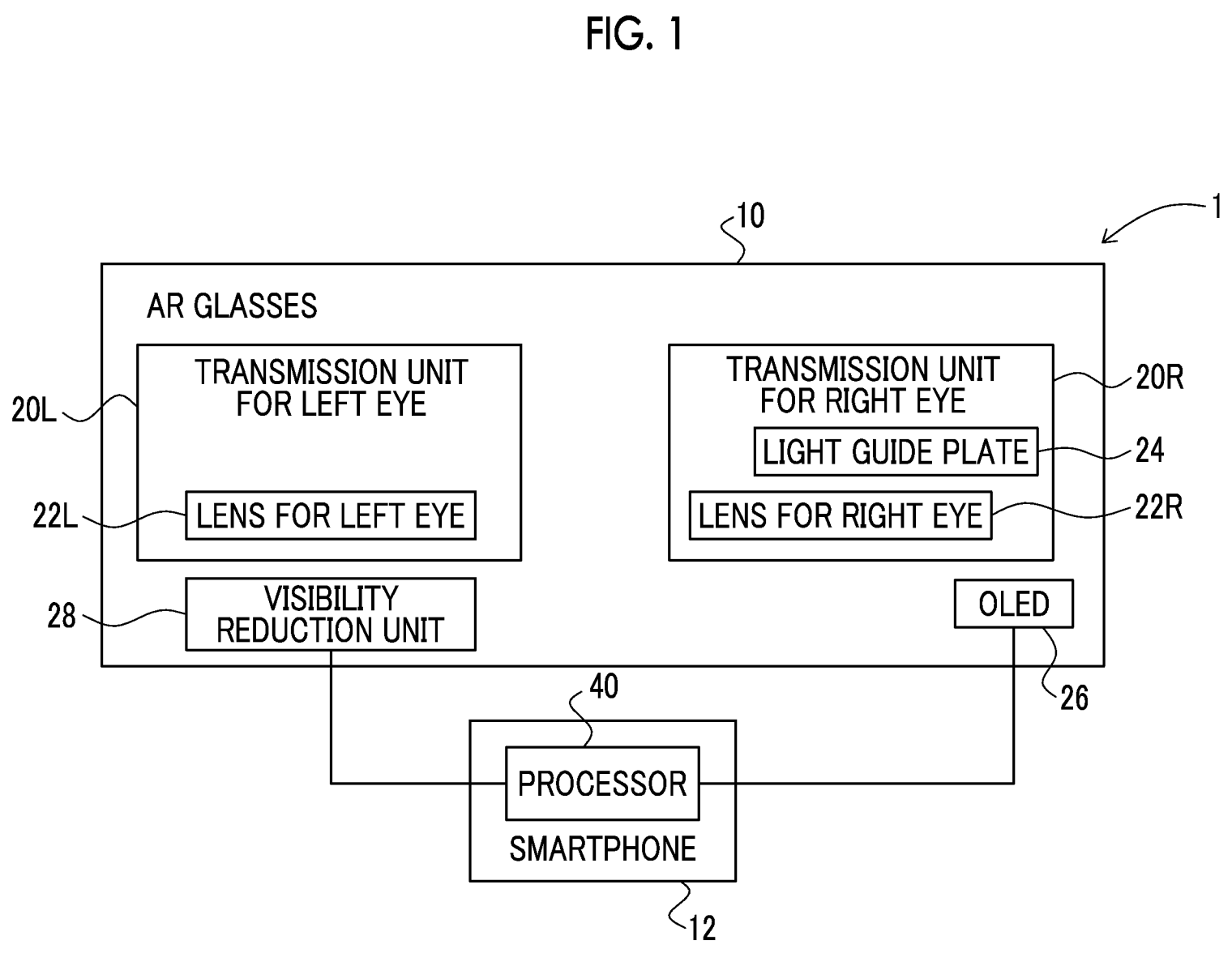

AR GLASSES

TRANSMISSION UNIT FOR RIGHT EYE — 20R

LIGHT GUIDE PLATE — 24

LENS FOR RIGHT EYE — 22R

OLED — 26

TRANSMISSION UNIT FOR LEFT EYE — 20L

LENS FOR LEFT EYE — 22L

VISIBILITY REDUCTION UNIT — 28

PROCESSOR — 40

SMARTPHONE — 12

LEFT EYE-VISUALLY-RECOGNIZED
IMAGE
= REAL IMAGE

RIGHT EYE-VISUALLY-RECOGNIZED
IMAGE
= REAL IMAGE

FIG. 7
| TRANSMITTANCE $\alpha$ (%) | LIGHT SHIELDING RATE $\beta$ (%) |
|---|---|
| $80 \leq \alpha \leq 100$ | $\beta = 0$ |
| $35 \leq \alpha < 80$ | $B = 50$ |
| $0 \leq \alpha < 35$ | $B = 100$ |
FIG. 8
| DEPTH $\gamma$ (m) | LIGHT SHIELDING RATE $\beta$ (%) |
|---|---|
| $30 \leq \alpha$ | $\beta = 0$ |
| $10 \leq \alpha < 30$ | $B = 50$ |
| $0 \leq \alpha < 10$ | $B = 100$ |
FIG. 9
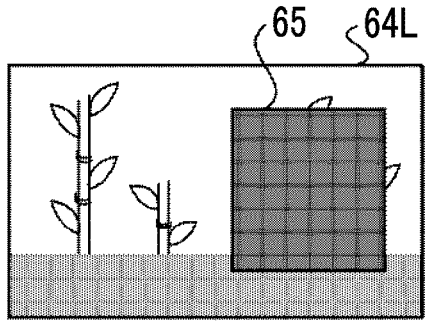
SHIELDING OF LEFT EYE
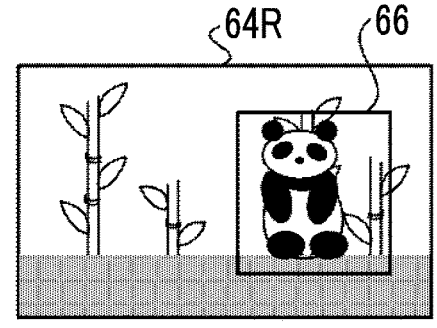
REAL IMAGE + PROJECTION IMAGE
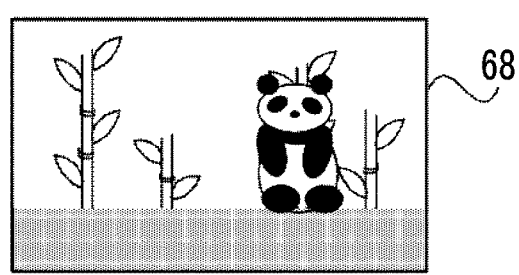

FIG. 10
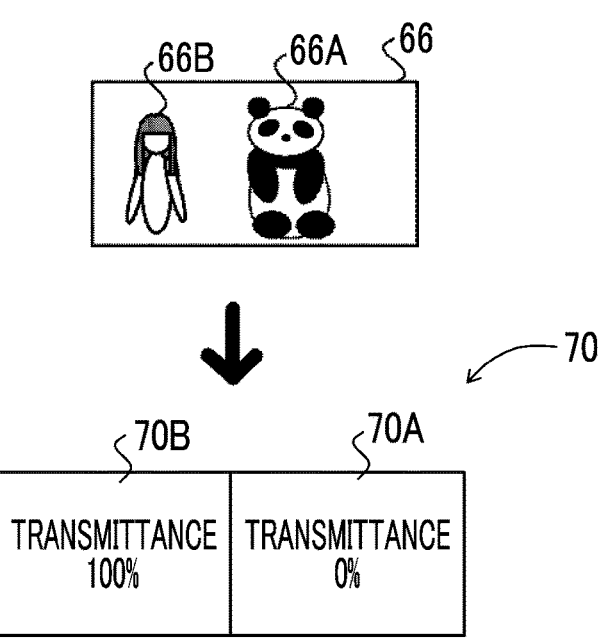
| TRANSMITTANCE 100% | TRANSMITTANCE 0% |
FIG. 11
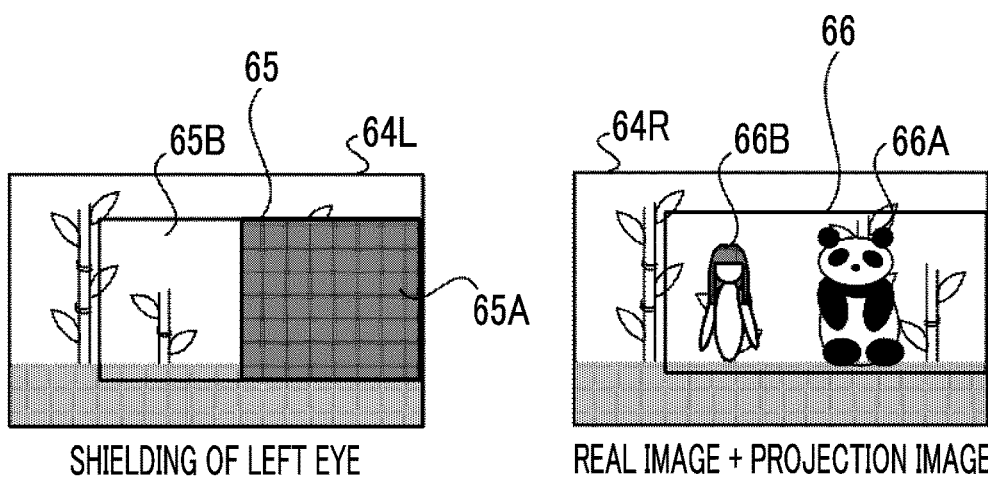
SHIELDING OF LEFT EYE          REAL IMAGE + PROJECTION IMAGE
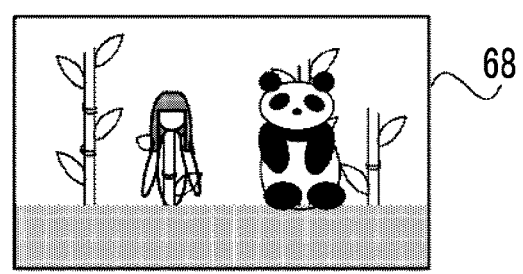

FIG. 12

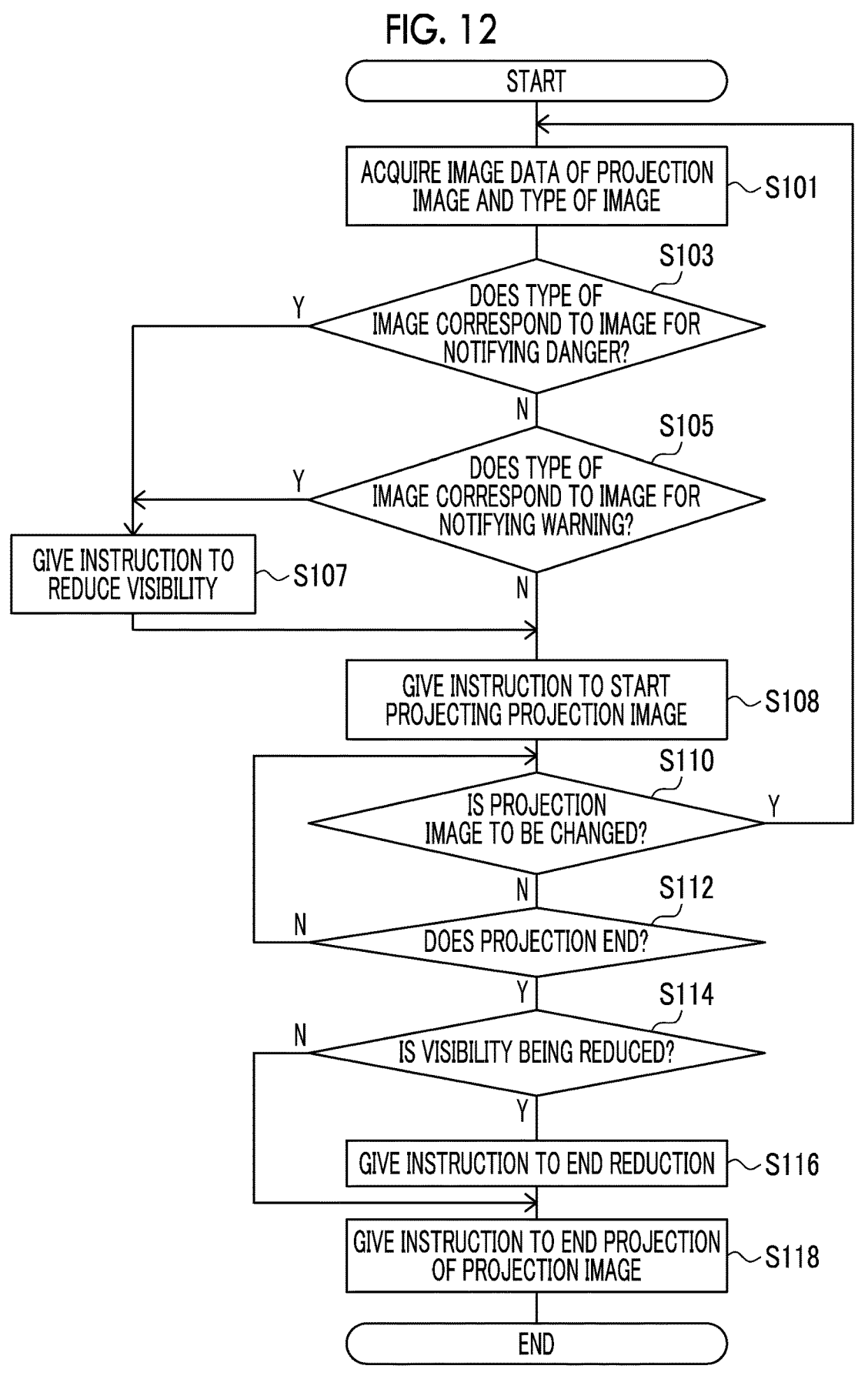

START

ACQUIRE IMAGE DATA OF PROJECTION IMAGE AND TYPE OF IMAGE — S101

S103
DOES TYPE OF IMAGE CORRESPOND TO IMAGE FOR NOTIFYING DANGER?
Y
N

S105
DOES TYPE OF IMAGE CORRESPOND TO IMAGE FOR NOTIFYING WARNING?
Y
N

GIVE INSTRUCTION TO REDUCE VISIBILITY — S107

GIVE INSTRUCTION TO START PROJECTING PROJECTION IMAGE — S108

S110
IS PROJECTION IMAGE TO BE CHANGED?
Y
N

S112
DOES PROJECTION END?
N
Y

S114
IS VISIBILITY BEING REDUCED?
N
Y

GIVE INSTRUCTION TO END REDUCTION — S116

GIVE INSTRUCTION TO END PROJECTION OF PROJECTION IMAGE — S118

END

RIGHT EYE-VISUALLY-RECOGNIZED
IMAGE
= REAL IMAGE

FIG. 16

GLASSES-TYPE INFORMATION DISPLAY DEVICE, DISPLAY CONTROL METHOD, AND DISPLAY CONTROL PROGRAM

CROSS REFERENCE TO RELATED APPLICATIONS

This application claims priority from Japanese Application No. 2022-030211, filed on Feb. 28, 2022, the entire disclosure of which is incorporated herein by reference.

BACKGROUND

1. Technical Field

The present disclosure relates to a glasses-type information display device, a display control method, and a non-transitory computer-readable storage medium storing a display control program.

2. Related Art

A glasses-type information display device, such as an augmented reality (AR) device that displays a state where an image is superimposed on a real world, is known in the related art as a display device that displays a three-dimensional video.

As the glasses-type information display device, there is a device that allows a user to visually recognize a real world as a real image with one eye of the right eye and the left eye and to visually recognize a projected image with the other eye. According to this device, the real image and the projected image are combined with each other in the brain of the user, so that the user visually recognizes a state where the projected image is superimposed on the real image. In this case, since the user visually recognizes the real image with one eye, the real image may be seen through the projected image.

Accordingly, there is known a technique for limiting the visual recognition of a real image to an eye on a side where an image is not projected and the real image is visually recognized. For example, JP2005-26819A1 and JP2005-195822A disclose techniques in which a display for displaying an image is provided on a predetermined one eye side of a glasses-shaped display device body and a shield plate for blocking light incident from the outside is fixed to the predetermined other eye side of the display device body not to allow the real image to be visually recognized with the other eye.

SUMMARY

According to the techniques disclosed in JP2005-26819A1 and JP2005-195822A, since the predetermined other eye side is always shielded, the real image is always not seen through the projected image. For this reason, depending on an image, it may not be possible to say that the image is visually recognized in an appropriate state.

The present disclosure has been made in consideration of the above-mentioned circumstances, and an object of the present disclosure is to provide a glasses-type information display device, a display control method, and a display control program that allow a projected image to be visually recognized in an appropriate state.

A glasses-type information display device according to a first aspect of the present disclosure comprises a first transmission unit and a second transmission unit, a projection unit that projects an image onto the first transmission unit, a visibility reduction unit that reduces visibility of a real image visually recognized by a user through the second transmission unit, and a processor that is configured to perform a control to cause the visibility reduction unit to reduce the visibility on the basis of a display priority given to the image.

According to a second aspect of the present disclosure, in the glasses-type information display device according to the first aspect, the first transmission unit and the second transmission unit are disposed in front of a right eye and a left eye of the user in use and provide visual fields of the real image to the right eye and the left eye, respectively, the projection unit inserts information into the visual field of the real image, which is visually recognized by the user through the first transmission unit, in a superimposed manner, and the processor is configured to perform the control in a case in which the projection unit projects the image onto the first transmission unit.

According to a third aspect of the present disclosure, in the glasses-type information display device according to the first or second aspect, the display priority is transmittance data or depth data that represents a transmittance of the image superimposed on the real image.

According to a fourth aspect of the present disclosure, in the glasses-type information display device according to the first aspect, the image in which the display priority is preset is at least one of an image for notifying a danger or an image for notifying a warning.

According to a fifth aspect of the present disclosure, in the glasses-type information display device according to any one of the first to fourth aspects, the visibility reduction unit changes optical characteristics of the second transmission unit to reduce the visibility of the real image.

According to a sixth aspect of the present disclosure, in the glasses-type information display device according to the fifth aspect, the processor is configured to determine an amount of reduction by which the visibility reduction unit is to reduce the visibility according to the display priority.

According to a seventh aspect of the present disclosure, in the glasses-type information display device according to the fifth or sixth aspect, the visibility reduction unit changes the optical characteristics of a region of the second transmission unit that corresponds to a region of the first transmission unit onto which the image is projected.

According to an eighth aspect of the present disclosure, in the glasses-type information display device according to any one of the fifth to seventh aspects, the visibility reduction unit adjusts a light shielding rate of the second transmission unit to reduce the visibility.

According to a ninth aspect of the present disclosure, in the glasses-type information display device according to the eighth aspect, the visibility reduction unit is a liquid crystal shutter, electrochromism, or a variable neutral density (ND) filter.

According to a tenth aspect of the present disclosure, in the glasses-type information display device according to any one of the fifth to seventh aspects, the visibility reduction unit adjusts a diopter of the second transmission unit to reduce the visibility.

According to an eleventh aspect of the present disclosure, in the glasses-type information display device according to the tenth aspect, the visibility reduction unit is a mechanism that shifts a focus of the second transmission unit.

According to a twelfth aspect of the present disclosure, in the glasses-type information display device according to any one of the first to eleventh aspects, in a case in which a transmittance map representing a transmittance distribution in the image is set for the image to be projected onto the first transmission unit, the processor is configured to change an amount of reduction, by which the visibility is to be reduced in the second transmission unit, for each region on the basis of the transmittance map.

According to a thirteenth aspect of the present disclosure, in the glasses-type information display device according to any one of the first to twelfth aspects, the visibility reduction unit also adjusts a light shielding rate or a diopter of the first transmission unit.

According to a fourteenth aspect of the present disclosure, in the glasses-type information display device according to the first aspect, the visibility reduction unit is a message display unit that displays a message prompting the user to close one eye, which corresponds to the second transmission unit, of the right eye and the left eye.

According to a fifteenth aspect of the present disclosure, in the glasses-type information display device according to the fourteenth aspect, the visibility reduction unit displays a message, which prompts the user to close the right eye, on at least one of the first transmission unit or the second transmission unit in a case in which the eye corresponding to the second transmission unit is the right eye, and displays a message, which prompts the user to close the left eye, on at least one of the first transmission unit or the second transmission unit in a case in which the eye corresponding to the second transmission unit is the left eye.

A display control method according to a sixteenth aspect of the present disclosure is a display control method for a glasses-type information display device including a first transmission unit and a second transmission unit, a projection unit that projects an image onto the first transmission unit, and a visibility reduction unit that reduces visibility of a real image visually recognized by a user through the second transmission unit. The method comprises performing a control to cause the visibility reduction unit to reduce the visibility on the basis of a display priority, which is given to the image, using a processor.

According to a seventeenth aspect of the present disclosure, in the display control method according to the sixteenth aspect, the first transmission unit and the second transmission unit are disposed in front of a right eye and a left eye of the user in use and provide visual fields of the real image to the right eye and the left eye, respectively, the projection unit inserts information into the visual field of the real image, which is visually recognized by the user through the first transmission unit, in a superimposed manner, and the control is performed by the processor in a case in which the projection unit projects the image onto the first transmission unit.

A non-transitory computer-readable storage medium storing a display control program according to an eighteenth aspect of the present disclosure is a display control program for a glasses-type information display device including a first transmission unit and a second transmission unit, a projection unit that projects an image onto the first transmission unit, and a visibility reduction unit that reduces visibility of a real image visually recognized by a user through the second transmission unit. The display control program executes a processor to perform processing for performing a control to cause the visibility reduction unit to reduce the visibility on the basis of a display priority given to the image.

According to a nineteenth aspect of the present disclosure, in a non-transitory computer-readable storage medium according to the eighteenth aspect, the first transmission unit and the second transmission unit are disposed in front of a right eye and a left eye of the user in use and provide visual fields of the real image to the right eye and the left eye, respectively, the projection unit inserts information into the visual field of the real image, which is visually recognized by the user through the first transmission unit, in a superimposed manner, and the display control program executable by the processor to further perform processing for performing the control in a case in which the projection unit projects the image onto the first transmission unit.

According to the present disclosure, a projected image can be visually recognized in an appropriate state.

BRIEF DESCRIPTION OF THE DRAWINGS

FIG. 1 is a diagram showing an example of the configuration of a glasses-type information display device according to an embodiment.

FIG. 7 is a diagram illustrating an example of a correspondence relationship between a transmittance and a light shielding rate.

FIG. 8 is a diagram illustrating an example of a correspondence relationship between a depth of Modification example 1 and a light shielding rate.

FIG. 9 is a diagram illustrating an example of a region of which visibility is to be reduced by a visibility reduction unit of Modification example 2.

FIG. 10 is a diagram illustrating a transmittance map of Modification example 3.

FIG. 11 is a diagram illustrating a reduction in the visibility of a real image based on the transmittance map.

FIG. 12 is a flowchart showing an example of display control processing that is performed by a smartphone of Modification example 4.

FIG. 16 is a diagram showing an example of the configuration of a glasses-type information display device of Modification example 7.

DESCRIPTION OF EMBODIMENTS

Examples of an embodiment of a technique of the present disclosure will be described in detail below with reference to the drawings.

The configuration of a glasses-type information display device 1 according to the present embodiment will be described with reference to FIG. 1. As shown in FIG. 1, the glasses-type information display device 1 according to the present embodiment comprises augmented reality (AR) glasses 10 and a smartphone 12.

Figure 2:
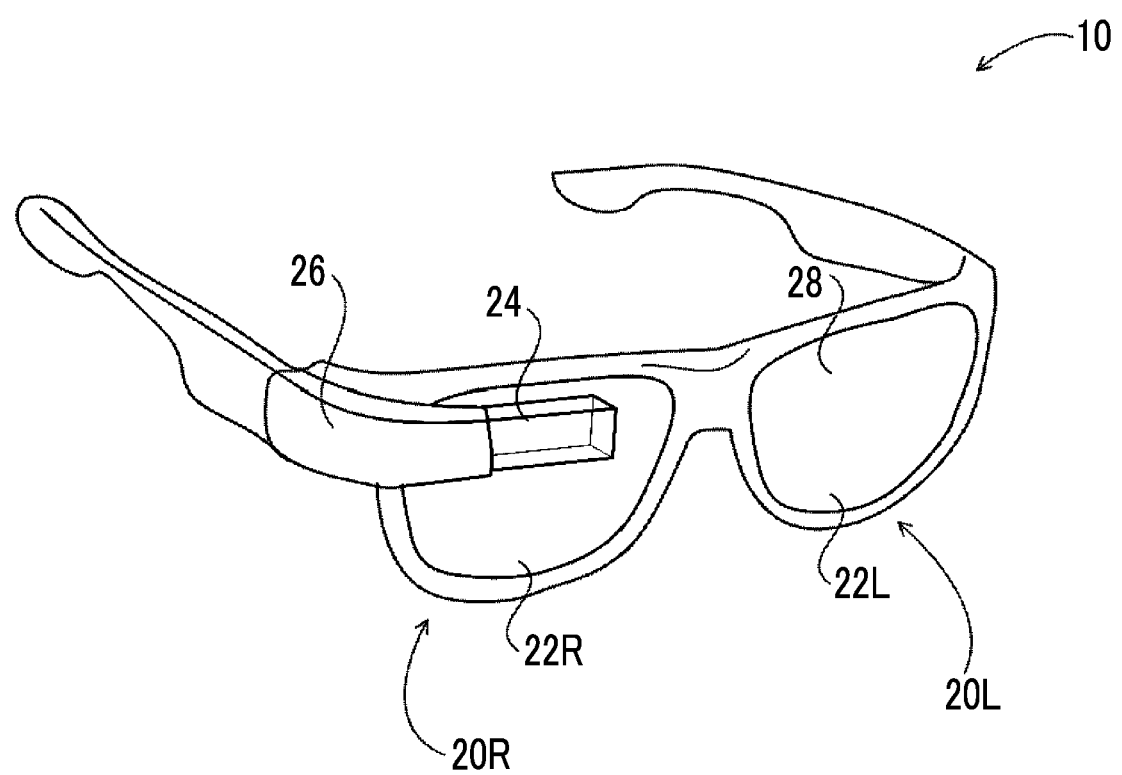
FIG. 2 is a perspective view showing an example of AR glasses of the embodiment.

The AR glasses 10 are a device that allows a user to visually recognize a projection image, which is projected from an organic light emitting diode (OLED) 26, in a state where the projection image is superimposed on a real image. FIG. 2 is a perspective view of an example of the AR glasses 10 of the present embodiment. As shown in FIGS. 1 and 2, the AR glasses 10 comprise a pair of a transmission unit 20L for a left eye and a transmission unit 20R for a right eye, an OLED 26, and a visibility reduction unit 28. The transmission unit 20L for a left eye and the transmission unit 20R for a right eye of the present embodiment are an example of a pair of a first transmission unit and a second transmission unit of the present disclosure. The transmission unit 20L for a left eye is an example of the second transmission unit of the present disclosure, and the transmission unit 20R for a right eye is an example of the first transmission unit of the present disclosure. Further, the OLED 26 of the present embodiment is an example of a projection unit of the present disclosure.

The OLED 26 projects an image (projection image), which represents information, onto the transmission unit 20R for a right eye in order to insert information into the visual field of a real image, which is visually recognized by the user through the transmission unit 20R for a right eye, in a superimposed manner.

The transmission unit 20R for a right eye includes a lens 22R for a right eye and a light guide plate 24. Light corresponding to the projection image projected from the OLED 26 is incident on one end of the light guide plate 24. The direction of light propagated through the light guide plate 24 is changed at an emission portion (not shown), and the light is emitted in a direction of the user's eye. The light, which is emitted from the light guide plate 24 and corresponds to the projection image, is transmitted through the lens 22R for a right eye and is guided to the right eye of the user. Further, the user visually recognizes the real world, which is shown through the lens 22R for a right eye, as a real image with the right eye.

For this reason, while the projection image is projected from the OLED 26, the visually-recognized image visually recognized with the right eye of the user is in a state where the projection image projected onto the light guide plate 24 is superimposed on the real image representing the real world shown through the lens 22R for a right eye. Further, while the projection image is not projected from the OLED 26, the visually-recognized image visually recognized by the user is the real image that represents the real world shown through the lens 22R for a right eye and the light guide plate 24.

Meanwhile, the transmission unit 20L for a left eye includes a lens 22L for a left eye. The user visually recognizes the real world, which is shown through the lens 22L for a left eye, with the left eye.

In a case where the OLED 26 projects the projection image onto the light guide plate 24, the visibility reduction unit 28 reduces the visibility of the real image that is visually recognized by the user through the lens 22L for a left eye. For example, the visibility reduction unit 28 of the present embodiment changes the optical characteristics of the transmission unit 20L for a left eye to shield the entire lens 22L for a left eye. Further, as an example in which the visibility reduction unit 28 of the present embodiment changes the optical characteristics of the transmission unit 20L for a left eye, the visibility reduction unit 28 adjusts a light shielding rate of the transmission unit 20L for a left eye, more specifically, the lens 22L for a left eye stepwise to reduce the visibility of the real image that is visually recognized with the left eye of the user stepwise. Examples of such a visibility reduction unit 28 include a liquid crystal shutter, electrochromism, a variable neutral density (ND) filter, and the like.

Meanwhile, the smartphone 12 comprises a processor 40. The processor 40 of the present embodiment controls the OLED 26 to project the projection image onto the light guide plate 24 from the OLED 26. Further, the processor 40 controls the visibility reduction unit 28 to reduce the visibility of the real image according to a display priority given to the projection image.

Figure 3:
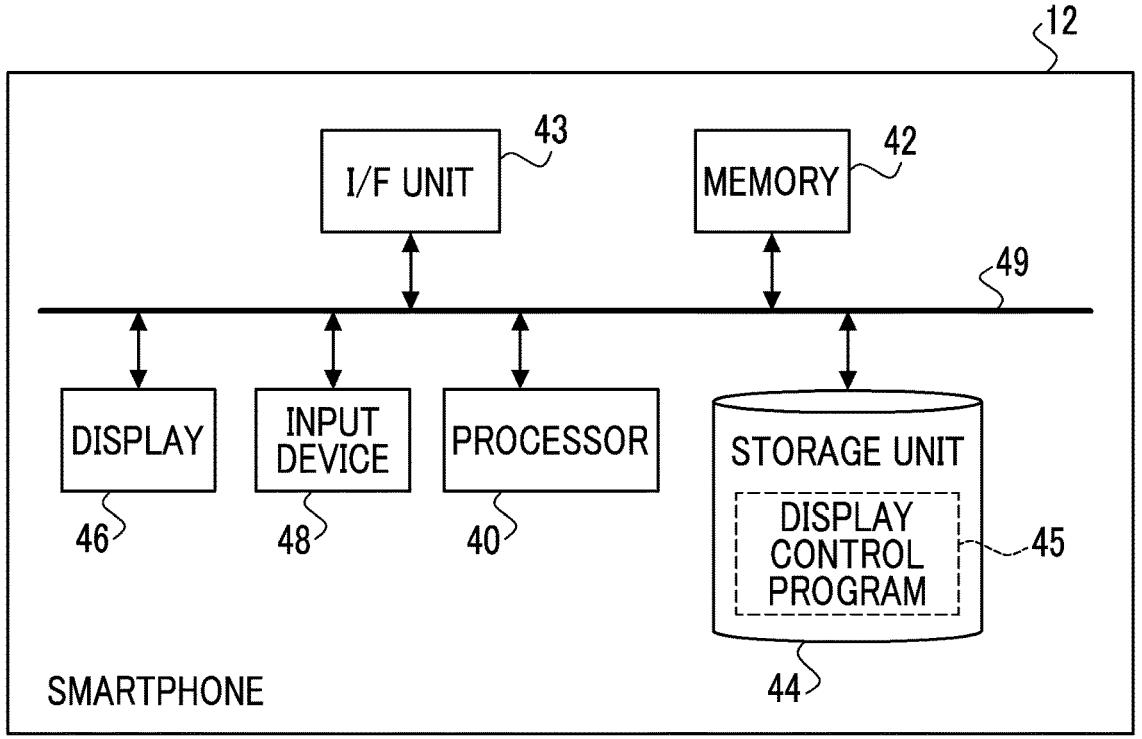
FIG. 3 is a block diagram showing an example of the configuration of a smartphone of the embodiment.

FIG. 3 is a block diagram showing an example of the configuration of the smartphone 12 that is related to functions related to the projection of the projection image and a reduction in the visibility of the real image. As shown in FIG. 3, the smartphone 12 comprises a processor 40, a memory 42, an interface (I/F) unit 43, a storage unit 44, a display 46, and an input device 48. The processor 40, the memory 42, the I/F unit 43, the storage unit 44, the display 46, and the input device 48 are connected to each other via a bus 49, such as a system bus or a control bus, such that various types of information can be given and received therebetween.

The processor 40 reads out various programs, which include a display control program 45 stored in the storage unit 44, to the memory 42 and performs processing corresponding to the program read out. Accordingly, the processor 40 controls the projection of the projection image that is performed by the OLED 26, and performs a control to cause the visibility reduction unit 28 to reduce visibility. The memory 42 is a work memory that is used in a case where the processor 40 performs processing.

The display control program 45, the image data (not shown) of the projection image projected from the OLED 26, various other types of information, and the like are stored in the storage unit 44. Specific examples of the storage unit 44 include a hard disk drive (HDD), a solid state drive (SSD), and the like.

The I/F unit 43 communicates various types of information to each of the OLED 26 and the visibility reduction unit 28 using wireless communication or wired communication. The display 46 and the input device 48 function as a user interface. The display 46 provides various types of information, which is related to the projection of the projection image, to a user. The display 46 is not particularly limited, and examples of the display 46 include a liquid crystal monitor, a light emitting diode (LED) monitor, and the like. Further, the input device 48 is operated by a user so that various instructions related to the projection of the projection image are input. The input device 48 is not particularly limited, and examples of the input device 48 include a keyboard, a touch pen, a mouse, and the like. A touch panel display in which the display 46 and the input device 48 are integrated with each other is employed in the smartphone 12.

Further, the function of the smartphone 12 of the present embodiment will be described. The processor 40 of the smartphone 12 of the present embodiment has a function of performing a control to cause the visibility reduction unit 28 to reduce visibility on the basis of the display priority given to the projection image. In other words, in a case where the OLED 26 projects the projection image onto the light guide plate 24, the processor 40 of the present embodiment reduces real visibility, which is visually recognized by a user through the transmission unit 20L for a left eye, by the visibility reduction unit 28 on the basis of transmittance data given to the projection image.

Here, a reduction in the visibility of the real image based on a priority will be described.

Figure 4A:
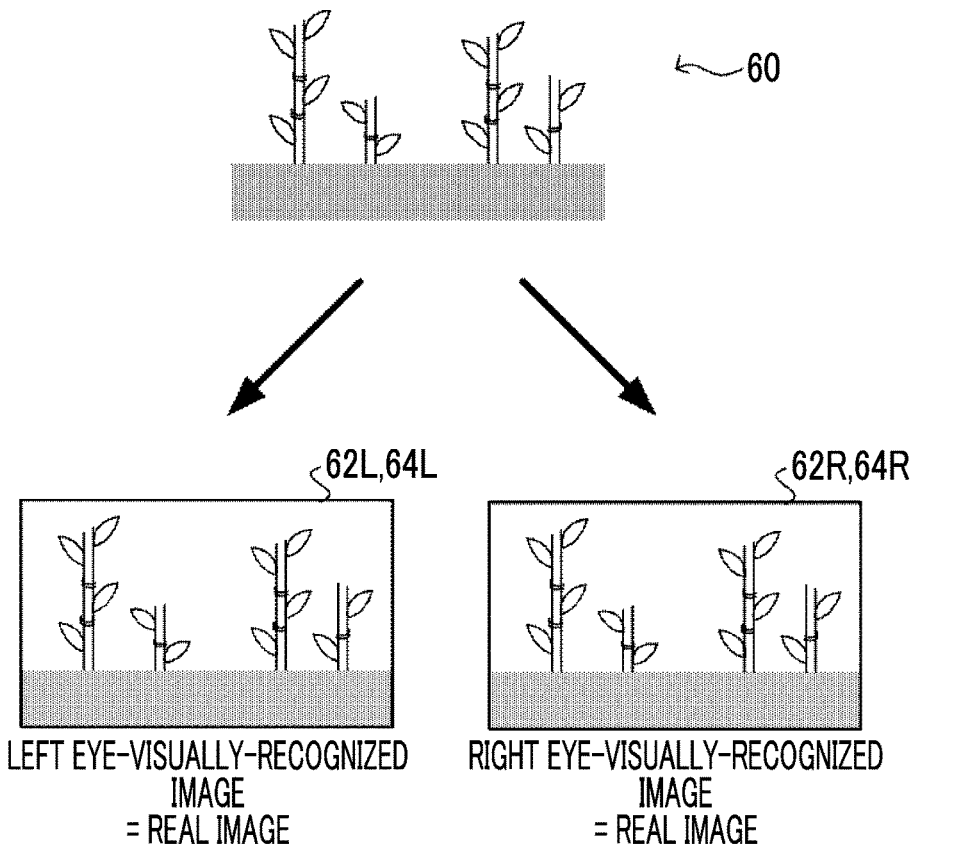
FIG. 4A is a diagram illustrating a reduction in the visibility of a real image based on a priority.

FIG. 4A illustrates a state where a user who uses the glasses-type information display device 1 visually recognizes a real world 60. As shown in FIG. 4A, in a case where the user visually recognizes the real world 60 in a state where the projection image is not projected from the OLED 26, a right eye-visually-recognized image 62R, which is visually recognized with the right eye through the transmission unit 20R for a right eye, is a right eye-real image 64R and a left eye-visually-recognized image 62L, which is visually recognized with the left eye through the transmission unit 20L for a left eye, is a left eye-real image 64L.

Figure 4B:
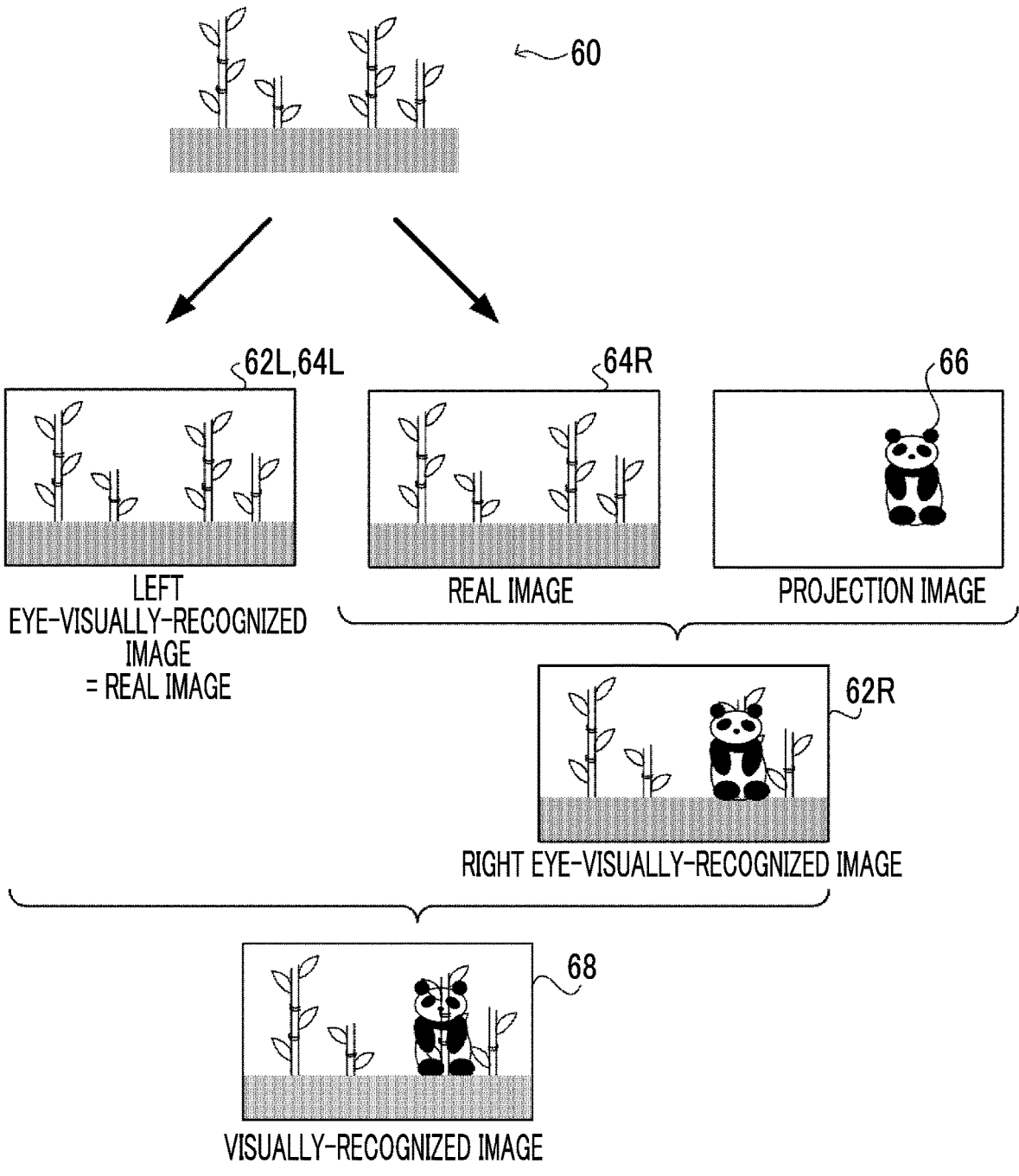
FIG. 4B is a diagram illustrating a reduction in the visibility of a real image based on a priority.

In a case where a projection image 66 is projected onto the light guide plate 24 from the OLED 26 in this state, the right eye-visually-recognized image 62R, which is visually recognized with the right eye by the user, is an image in which the right eye-real image 64R and the projection image 66 are superimposed as shown in FIG. 4B. In this case, the right eye-real image 64R is hidden by the projection image 66, and a portion of the right eye-real image 64R on which the projection image 66 is superimposed is not visually recognized with the right eye of the user. A visually-recognized image 68, which is finally visually recognized by the user, is an image in which the right eye-visually-recognized image 62R and the left eye-visually-recognized image 62L are combined with each other in the brain of the user. Since the projection image 66 is not visually recognized with the left eye of the user in a case shown in FIG. 4B, a region of the visually-recognized image 68 in which the projection image 66 is visually recognized corresponds to an image in which the left eye-visually-recognized image 62L visually recognized with the left eye and the projection image 66 visually recognized with the right eye are combined with each other. For this reason, the real image to be hidden by the projection image 66 is visually recognized as shown in FIG. 4B, that is, a state where the projection image 66 is seen to be transparent is made.

Figure 4C:
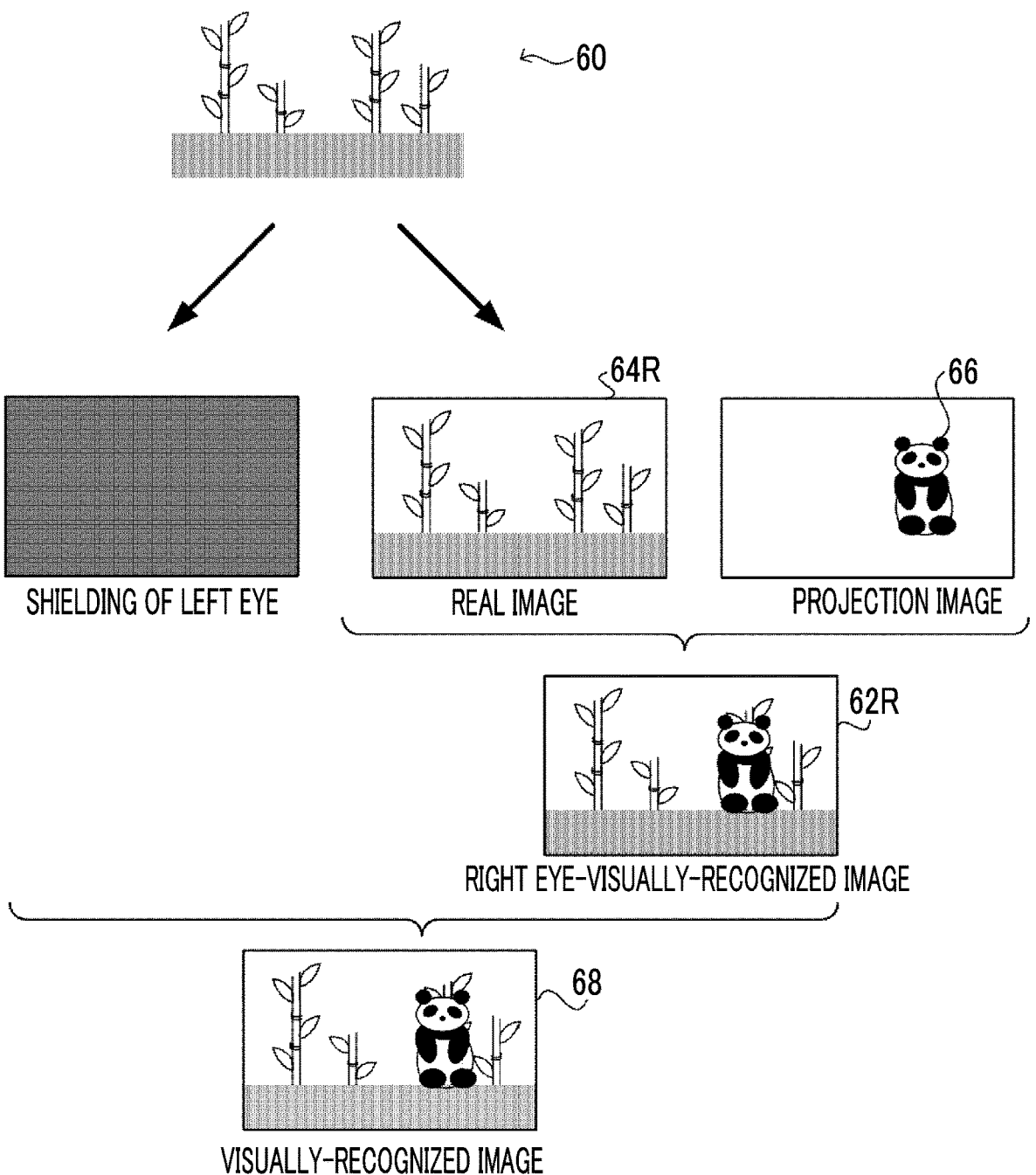
FIG. 4C is a diagram illustrating a reduction in the visibility of a real image based on a priority.

FIG. 4C shows a state where the visibility of the transmission unit 20L for a left eye is reduced by the visibility reduction unit 28. FIG. 4C shows a state where the entire lens 22L for a left eye is completely shielded by the visibility reduction unit 28. In this case, since light transmitted through the lens 22L for a left eye is completely blocked, the left eye-real image 64L is not visually recognized with the left eye of the user through the transmission unit 20L for a left eye. The visually-recognized image 68, which is finally visually recognized by the user, is an image equal to the right eye-visually-recognized image 62R. Accordingly, a state where the real image is hidden by the projection image 66 is made in the visually-recognized image 68. That is, a state where the projection image 66 is visually recognized by the user without being transparent is made.

In a case where the right eye-visually-recognized image 62R and the left eye-visually-recognized image 62L are combined with each other in the brain of the user as described above, the left eye-real image 64L is made to be invisible to the left eye in a region on which the projection image 66 visually recognized with the right eye is superimposed, so that the visually-recognized image 68 in which the real image is hidden by the projection image 66 can be visually recognized and the projection image 66 is made not to be transparent.

In the example shown in FIG. 4C, the projection image 66 is visually recognized without being transparent. However, in some cases, a user may want to visually recognize the visually-recognized image 68 in a state where the projection image 66 is transparent. For example, in a case where a user wants to project a projection image 66 of a person or an animal, which does not currently exist in the real world 60, to make it be seen as if the person or the animal exists, it is preferable that the projection image 66 is not transparent. On the other hand, in a case where the projection image 66 is a ghost, the projection image 66 can be seen to be transparent so that the projection image 66 looks more like a ghost.

In a case where the visibility of the left eye-real image 64L visually recognized by the user through the transmission unit 20L for a left eye is not reduced by the visibility reduction unit 28 as described above, the projection image 66 is seen to be transparent in the visually-recognized image 68 that is finally visually recognized by the user (see FIG. 4B). The degree of transmission of the projection image 66 in the visually-recognized image 68 is changed depending on the degree of a reduction in visibility that is reduced by the visibility reduction unit 28.

Figure 4D:
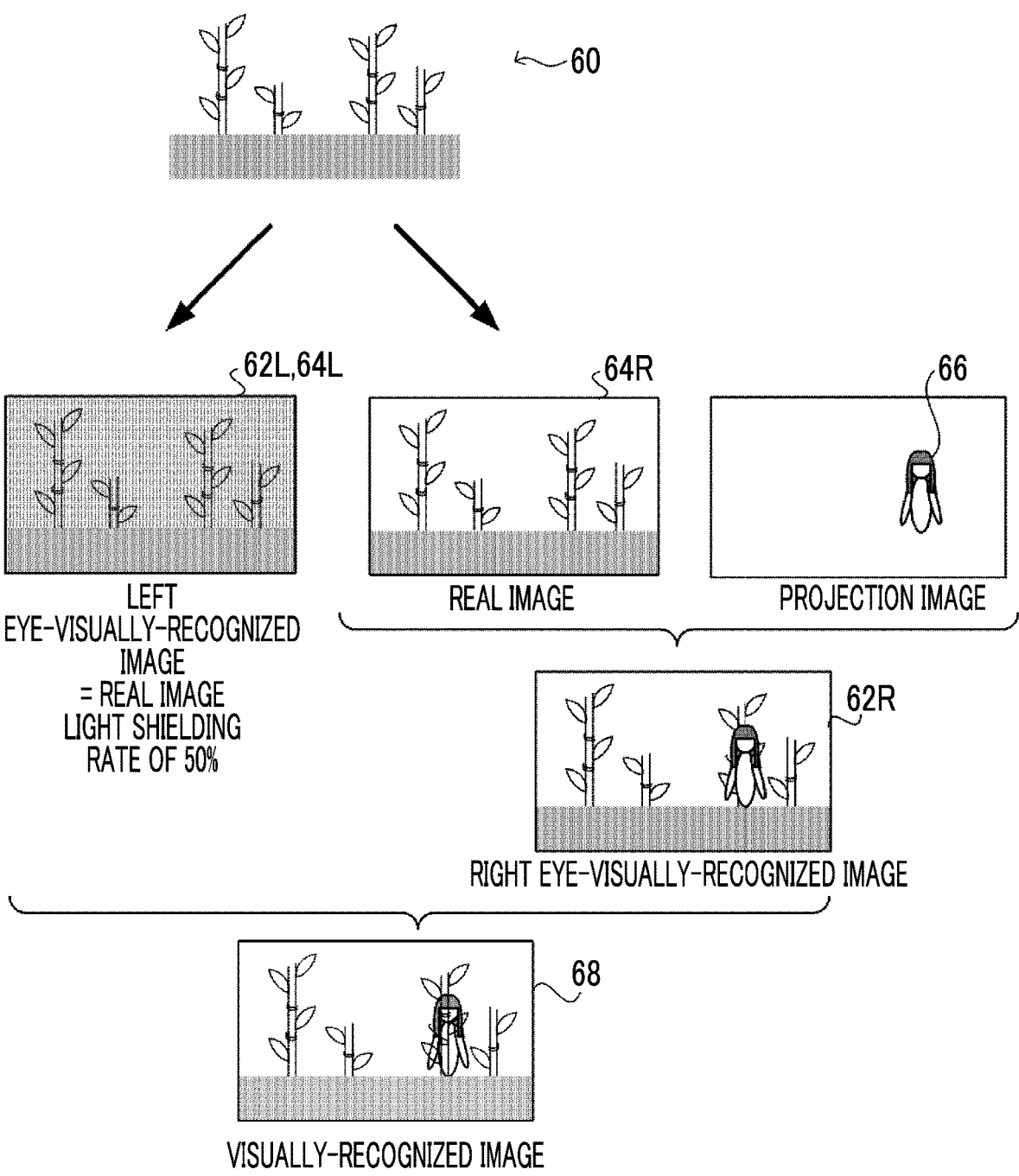
FIG. 4D is a diagram illustrating a reduction in the visibility of a real image based on a priority.

FIG. 4D shows a case where a light shielding rate adjusted by the visibility reduction unit 28 is set to 50%. In this case, the left eye-real image 64L is faintly visually recognized in the left eye-visually-recognized image 62L visually recognized with the left eye of the user. That is, the left eye-real image 64L is seen as if the real world 60 is visually recognized through sunglasses. For this reason, the degree of transmission of the projection image 66 in the visually-recognized image 68 finally visually recognized by the user is lower than in the state shown in FIG. 4B.

Accordingly, in the present embodiment, transmittance data are given to the projection image 66 as the display priority in regard to which of the display state of the projection image 66 and the display state of the real image should be prioritized. Further, for example, the display priority in the present embodiment is a display priority of the projection image 66 with respect to the real image. In a case where a transmittance represented by the transmittance data is 100%, a light shielding rate adjusted by the visibility reduction unit 28 is 100% and the transmission unit 20L for a left eye is completely shielded from light by the visibility reduction unit 28.

Figure 5:
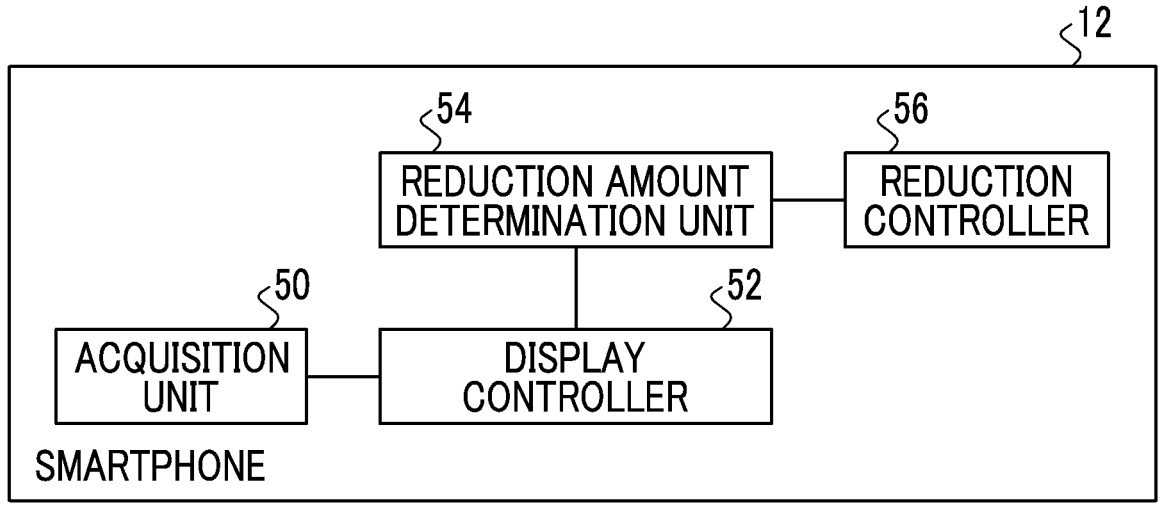
FIG. 5 is a block diagram showing an example of the hardware configuration of the smartphone of the embodiment.

FIG. 5 is a functional block diagram showing an example of the configuration that is related to the functions of the smartphone 12 of the present embodiment. As shown in FIGS. 4A, 4B, 4C, and 4D, the smartphone 12 comprises an acquisition unit 50, a display controller 52, a reduction amount determination unit 54, and a reduction controller 56. For example, the processor 40 of the smartphone 12 of the present embodiment executes the display control program 45 stored in the storage unit 44 to function as the acquisition unit 50, the display controller 52, the reduction amount determination unit 54, and the reduction controller 56.

The acquisition unit 50 has a function of acquiring the image data of the projection image that is projected from the OLED 26. For example, since the image data of the projection image are stored in the storage unit 44 in the present embodiment, the acquisition unit 50 acquires the image data of the projection image from the storage unit 44. Unlike in the present embodiment, the image data of the projection image may be acquired from a device, which is provided outside the smartphone 12, via the I/F unit 43. In the present embodiment, transmittance data (to be described in detail later), which represent the transmittance of the projection image to be superimposed on the real image, are given to the image data of the projection image as the display priority. The acquisition unit 50 outputs the image data of the projection image, to which the transmittance data are given, to the display controller 52.

The display controller 52 has a function of controlling the OLED 26 to project the projection image.

Further, the reduction amount determination unit 54 has a function of determining the amount of reduction by which the visibility reduction unit 28 is to reduce visibility according to the display priority given to the projection image. The reduction amount determination unit 54 of the present embodiment determines a light shielding rate that is adjusted by the visibility reduction unit 28 on the basis of the display priority.

The reduction controller 56 performs a control to cause the visibility reduction unit 28 to reduce visibility on the basis of the amount of reduction that is determined by the reduction amount determination unit 54. The reduction controller 56 of the present embodiment instructs the visibility reduction unit 28 to block light at the light shielding rate determined by the reduction amount determination unit 54. The visibility reduction unit 28 adjusts a light shielding rate to the instructed light shielding rate according to an instruction output from the smartphone 12 to reduce the visibility of the real image that is visually recognized by the user through the transmission unit 20L for a left eye.

Figure 6:
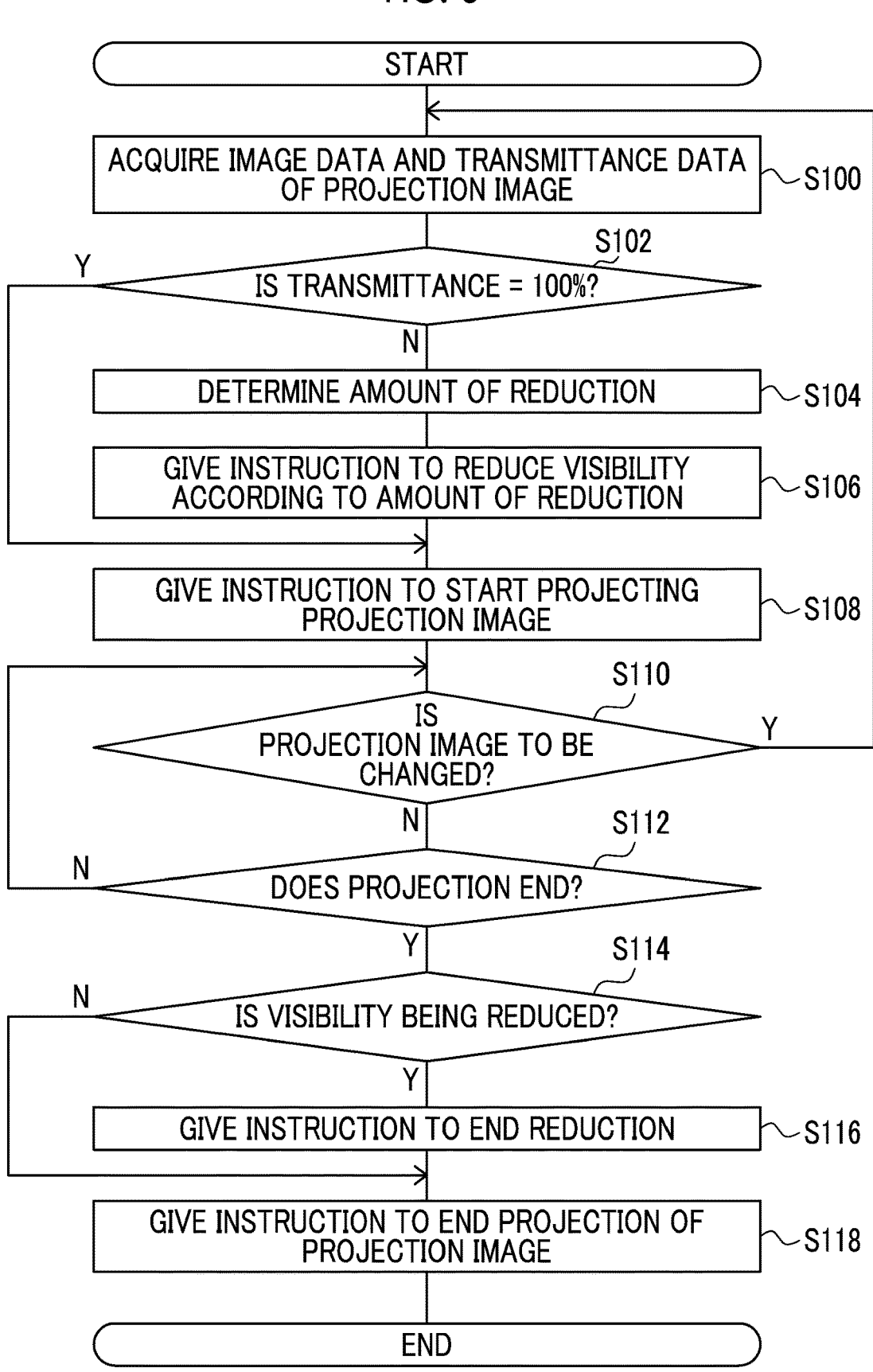
FIG. 6 is a flowchart showing an example of display control processing that is performed by the smartphone of the embodiment.

Next, the action of the glasses-type information display device 1 according to the present embodiment will be described. FIG. 6 is a flowchart showing an example of the flow of display control processing that is performed by the processor 40 of the smartphone 12 of the present embodiment. For example, in the smartphone 12 of the present embodiment, the processor 40 executes the display control program 45 stored in the storage unit 44 to perform the display control processing of which an example is shown in FIG. 6 in a case where an instruction to start projection, which is input using the input device 48 by a user, is received. The user visually recognizes the real world with both the left and right eyes through the transmission unit 20L for a left eye and the transmission unit 20R for a right eye at a point of time when the display control processing shown in FIG. 6 is started.

In Step S100 of FIG. 6, the acquisition unit 50 acquires the image data of a projection image, to which transmittance data are given as a display priority, from the storage unit 44 as described above.

In the next step S102, the reduction amount determination unit 54 determines whether or not the transmittance data given to the projection image acquired in Step S100 are 100%. A case where the transmittance data are 100% is a case where a light shielding rate adjusted by the visibility reduction unit 28 is 0%, that is, the visibility reduction unit 28 does not reduce visibility. In a case where the transmittance data given to the projection image are 100%, the determination in Step S102 is an affirmative determination and the processing proceeds to Step S108. On the other hand, in a case where the transmittance data given to the projection image are other than 100%, the determination in Step S102 is a negative determination and the processing proceeds to Step S104.

In Step S104, the reduction amount determination unit 54 determines the amount of reduction by which the visibility reduction unit 28 is to reduce real visibility from the transmittance data given to the projection image. In the present embodiment, a light shielding rate adjusted by the visibility reduction unit 28 is switched in three stages according to a transmittance. FIG. 7 shows an example of a correspondence relationship between a transmittance α and a light shielding rate β. In the example shown in FIG. 7, the light shielding rate β is set to 100% in a case where the transmittance α is 0% or more and less than 35%, the light shielding rate β is set to 50% in a case where the transmittance α is 35% or more and less than 80%, and the light shielding rate R is set to 0% in a case where the transmittance α is 80% or more and 100% or less. In the smartphone 12 of the present embodiment, information representing the correspondence relationship shown in FIG. 7 is stored in the storage unit 44 in advance. The reduction amount determination unit 54 refers to the information, which represents the correspondence relationship and is stored in the storage unit 44, and determines a light shielding rate β, which corresponds to the transmittance data given to the projection image acquired in Step S100, as the amount of reduction.

In the next step S106, the reduction controller 56 outputs an instruction to the visibility reduction unit 28 so that the visibility of the real image is reduced by the amount of reduction determined in Step S104. In a case where the instruction is input to the visibility reduction unit 28 from the smartphone 12, the visibility reduction unit 28 shields the transmission unit 20L for a left eye from light by the instructed amount of reduction and reduces the visibility of the real image.

In the next step S108, the display controller 52 outputs the image data of the projection image and a start instruction to start projection to the OLED 26 so that the projection image acquired in Step S100 is projected onto the light guide plate 24. In a case where the image data of the projection image and the start instruction to start projection are input to the OLED 26 from the smartphone 12, the OLED 26 projects the input projection image onto the light guide plate 24.

In the next step S110, the display controller 52 determines whether or not to change the projection image that is being projected. For example, in the present embodiment, in a case where an instruction to change the projection image input using the input device 48 by a user is received, the determination is an affirmative determination, the processing returns to Step S100, and the processing of Steps S100 to S108 is repeated. On the other hand, in a case where an instruction to change the projection image is not received, the determination in Step S110 is a negative determination and the processing proceeds to Step S112.

In Step S112, the display controller 52 determines whether or not to end the projection of the projection image. For example, in the present embodiment, in a case where an instruction to end projection, which is input using the input device 48 by the user, is received, the projection of the projection image ends. Accordingly, in a case where an instruction to end the projection of the projection image is not received, the processing returns to Step S110. On the other hand, in a case where an instruction to end the projection of the projection image is received, the determination in Step S112 is an affirmative determination and the processing proceeds to Step S114.

In Step S114, the reduction controller 56 determines whether or not the visibility of the real image is being reduced by the visibility reduction unit 28. In a case where the visibility of the real image is not being reduced, the determination is a negative determination and the processing proceeds to Step S118. On the other hand, in a case where the visibility of the real image is being reduced, the determination in Step S114 is an affirmative determination and the processing proceeds to Step S116.

In Step S116, the reduction controller 56 outputs an end instruction to the visibility reduction unit 28 so that the reduction of the visibility of the real image ends. In a case where the end instruction is input to the visibility reduction unit 28 from the smartphone 12, the visibility reduction unit 28 ends the shielding of the transmission unit 20L for a left eye from light and ends the reduction of the visibility of the real image.

In the next step S118, the display controller 52 outputs an end instruction to the OLED 26 so that the projection of the projection image ends. In a case where the end instruction is input to the OLED 26 from the smartphone 12, the OLED 26 ends the projection of the projection image. In a case where the processing of Step S118 ends, the display control processing shown in FIG. 6 ends.

In a case where the projection image is projected onto the light guide plate 24 of the transmission unit 20R for a right eye from the OLED 26, the glasses-type information display device 1 according to the present embodiment causes the visibility reduction unit 28 to reduce the visibility of the transmission unit 20L for a left eye on the basis of the display priority given to the projected projection image as described above. Accordingly, the degree of visibility of the projection image, which corresponds to the priority given to the projection image, in the visually-recognized image finally visually recognized by a user can be made appropriate.

Modification Example 1

An aspect in which transmittance data are used as the display priority has been described in the above-mentioned embodiment, but the display priority is not limited to the transmittance data. For example, the display priority may be depth data. An aspect in which depth data are used as the display priority given to the projection image will be described in this modification example.

The depth data are data that represent a depth from the user of the glasses-type information display device 1 to an object to be visually recognized. In other words, the depth data are data that define how many meters ahead of the user of the glasses-type information display device 1 the projection image is displayed as if being present. As the depth data are smaller, an object to be displayed by the projection image is present closer to the user. For this reason, in this modification example, as the depth data are smaller, the light shielding rate of the transmission unit 20L for a left eye is set to be higher so that the projection image is clearly visually recognized. Further, as the depth data are larger, the light shielding rate of the transmission unit 20L for a left eye is set to be lower so that the projection image is blurredly visually recognized.

Accordingly, in this modification example, the reduction amount determination unit 54 determines the amount of reduction by which the visibility reduction unit 28 is to reduce real visibility from the depth data given to the projection image. In this modification example, a light shielding rate adjusted by the visibility reduction unit 28 is switched in three stages according to a depth. FIG. 8 shows an example of a correspondence relationship between a depth γ and a light shielding rate β. In the example shown in FIG. 8, the light shielding rate β is set to 100% in a case where the depth γ is 0 m or more and less than 10 m, the light shielding rate β is set to 50% in a case where the depth γ is 10 m or more and less than 30 m, and the light shielding rate β is set to 0% in a case where the depth γ is 30 m or more. In the smartphone 12 of this modification example, information representing the correspondence relationship shown in FIG. 8 is stored in the storage unit 44 in advance. The reduction amount determination unit 54 refers to the information, which represents the correspondence relationship and is stored in the storage unit 44, and determines a light shielding rate β, which corresponds to the depth data given to the projection image acquired by the acquisition unit 50, as the amount of reduction.

Modification Example 2

An aspect in which the visibility reduction unit 28 reduces the visibility of the entire transmission unit 20L for a left eye, specifically, the entire lens 22L for a left eye has been described in the above-mentioned embodiment, but a region of which the visibility is to be reduced by the visibility reduction unit 28 may be at least a region that is superimposed on the projection image.

For example, as shown in FIG. 9, the visibility of the transmission unit 20L for a left eye may be reduced by the visibility reduction unit 28 according to a region in which the projection image 66 is displayed. FIG. 9 shows an example in which the visibility of a region corresponding to a projection image 66 as a shielding region 65 is reduced. In the example shown in FIG. 9, a user can visually recognize a left eye-real image 64L with the left eye corresponding to a region in which the projection image 66 is not displayed. Therefore, according to this modification example, it is possible to reduce a range in which the user's visual recognition of the real image is blocked in the transmission unit 20L for a left eye.

Modification Example 3

An aspect in which a display priority having a uniform value is given to the entire projection image has been described in the above-mentioned embodiment, but the value of a display priority is not limited to this aspect and the values of display priorities may differ in a screen of the projection image. For example, the amount of reduction by which the visibility of the transmission unit 20L for a left eye is to be reduced may be changed for each region on the basis of a transmittance map that represents the transmittance distribution of the projection image in the image.

FIG. 10 shows an example of a transmittance map 70 that is set for a projection image 66 including an image 66A and an image 66B. Since a user wants to cause the image 66A of the projection image 66 to be clearly visually recognized, a transmittance is set to 0% in a region 70A of the transmittance map 70 corresponding to the image 66A. On the other hand, since the user wants to cause the image 66B of the projection image 66 to be visually recognized in a state where the image 66B is transparent, a transmittance is set to 100% in a region 70B of the transmittance map 70 corresponding to the image 66B.

In this case, the visibility reduction unit 28 reduces the visibility of the transmission unit 20L for a left eye on the basis of the transmittance map 70. FIG. 11 shows a state where the visibility of the transmission unit 20L for a left eye is reduced by the visibility reduction unit 28 on the basis of the transmittance map 70. Since the visibility of a shielding region 65A, which corresponds to the region 70A of the transmittance map 70, of a shielding region 65 to be shielded by the visibility reduction unit 28 is reduced, a left eye-real image 64L is not visually recognized with the left eye of the user through the transmission unit 20L for a left eye. On the other hand, since the visibility of a shielding region 65B corresponding to the region 70B of the transmittance map 70 is not reduced, a left eye-real image 64L can be visually recognized with the left eye of the user through the transmission unit 20L for a left eye.

Accordingly, in a visually-recognized image 68 that is finally visually recognized by the user, the image 66A of the projection image 66 is visually recognized by the user without being transparent and the image 66B is visually recognized by the user in a state where the image 66B is transparent.

As described above, in this modification example, a display priority can be set for each image in a case where the projection image 66 includes a plurality of images (the images 66A and 66B in FIG. 10.). Accordingly, the degree of visibility of the projection image 66 can be made more appropriate.

Modification Example 4

Further, in a case where a display priority is predetermined according to the type of an image, the type of an image may be given to a projection image as the display priority. This case will be described using this modification example. For example, in a case where the type of an image corresponds to an image for notifying a danger or an image for notifying a warning, it is preferable that the image can be clearly visually recognized by a user. For this purpose, in a case where the type of a projection image corresponds to at least one of an image for notifying a danger or an image for notifying a warning, the display priority to be given is set to be high and a transmittance is set to be low.

The acquisition unit 50 of this modification example acquires the image data of the projection image to which the type of an image is given. The reduction amount determination unit 54 determines the amount of reduction by which visibility is to be reduced on the basis of the display priority preset according to the type of an image. Specifically, in a case where the type of an image to be given to the projection image corresponds to at least one of an image for notifying a danger or an image for notifying a warning, the reduction amount determination unit 54 of this modification example determines a light shielding rate to be 100%. In a case where the type of an image to be given to the projection image corresponds to other images, the reduction amount determination unit 54 of this modification example determines a light shielding rate to be 0%.

FIG. 12 is a flowchart showing an example of display control processing that is performed by a smartphone 12 of this modification example. The display control processing shown in FIG. 12 is different from the display control processing of the above-mentioned embodiment (see FIG. 6) in that Steps S101 to S107 are provided instead of Steps S100 to S106.

In Step S101 of FIG. 12, the acquisition unit 50 acquires the image data of a projection image, to which the type of an image is given as a display priority, from the storage unit 44 as described above.

In the next step S103, the reduction amount determination unit 54 determines whether or not the type of an image to be given to the projection image acquired in Step S100 corresponds to an image for notifying a danger. In a case where the type of an image corresponds to an image for notifying a danger, the determination is an affirmative determination and the processing proceeds to Step S107. On the other hand, in a case where the type of an image corresponds to images other than an image for notifying a danger, the determination is a negative determination and the processing proceeds to Step S105.

In Step S105, the reduction amount determination unit 54 determines whether or not the type of an image to be given to the projection image acquired in Step S100 corresponds to an image for notifying a warning. In a case where the type of an image corresponds to an image for notifying a warning, the determination is an affirmative determination and the processing proceeds to Step S107.

In Step S107, the reduction controller 56 outputs an instruction to the visibility reduction unit 28 so that the visibility of a real image is reduced. In a case where the instruction is input to the visibility reduction unit 28 from the smartphone 12, the visibility reduction unit 28 shields the transmission unit 20L for a left eye from light by the instructed amount of reduction and reduces the visibility of the real image.

As described above, in this modification example, the visibility of the transmission unit 20L for a left eye is reduced according to the type of an image by the visibility reduction unit 28.

An aspect in which a high display priority is given to at least one of an image for notifying a danger or an image for notifying a warning has been described above, but an aspect in which a display priority is given according to the type of an image is not limited to this aspect. For example, in a case where a projection image has contents not important to a user, a low display priority may be set for the type of an image corresponding to the projection image.

Modification Example 5

An aspect in which the visibility reduction unit 28 changes the optical characteristics of the transmission unit 20L for a left eye to reduce the visibility of the transmission unit 20L for a left eye has been described in each embodiment, but a method of reducing the visibility of the transmission unit 20L for a left eye is not limited to this aspect. An aspect in which a user oneself closes the left eye to reduce visibility will be described in this modification example.

Figure 13:
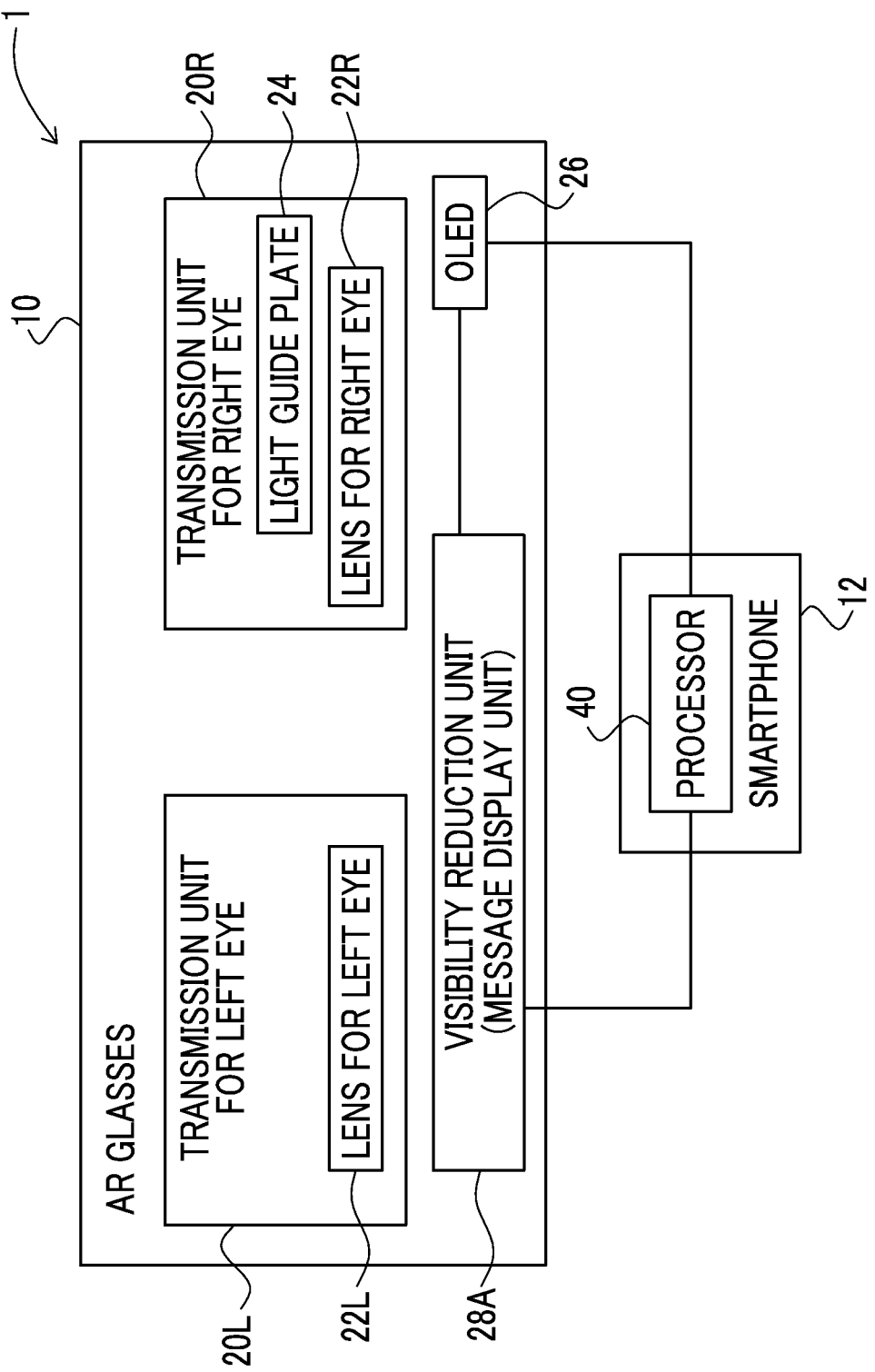
FIG. 13 is a diagram showing an example of the configuration of a glasses-type information display device of Modification example 5.
Figure 14:
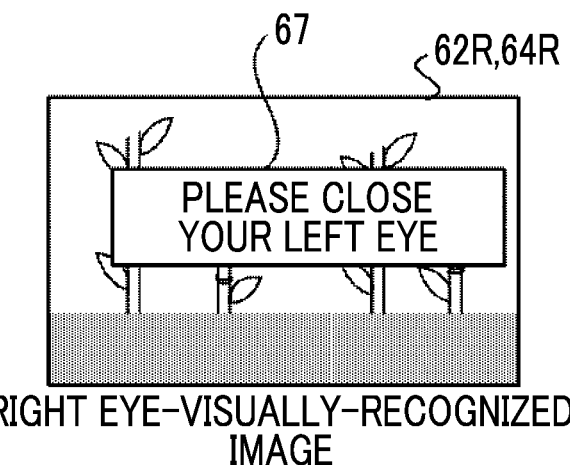
FIG. 14 is a diagram showing an example of a visually-recognized image in a case where a user visually recognizes a message prompting the user to close the left eye.

FIG. 13 is a diagram showing an example of the configuration of a glasses-type information display device 1 of this modification example. The glasses-type information display device 1 shown in FIG. 13 is different from the glasses-type information display device 1 according to the above-mentioned embodiment (see FIG. 1) in that a message display unit 28A is provided as a visibility reduction unit. The message display unit 28A uses the OLED 26 to project a message, which prompts a user to close the left eye, onto the light guide plate 24 as a projection image. FIG. 14 shows an example of a right eye-visually-recognized image 62R in a case where a user visually recognizes a state where a projection image 67 as a message prompting the user to close the left eye is displayed on the light guide plate 24. As shown in FIG. 14, the user can visually recognize the right eye-visually-recognized image 62R, in which the projection image 67 as a message prompting the user to close the left eye is superimposed on a right eye-real image 64R, with the right eye.

Figure 15:
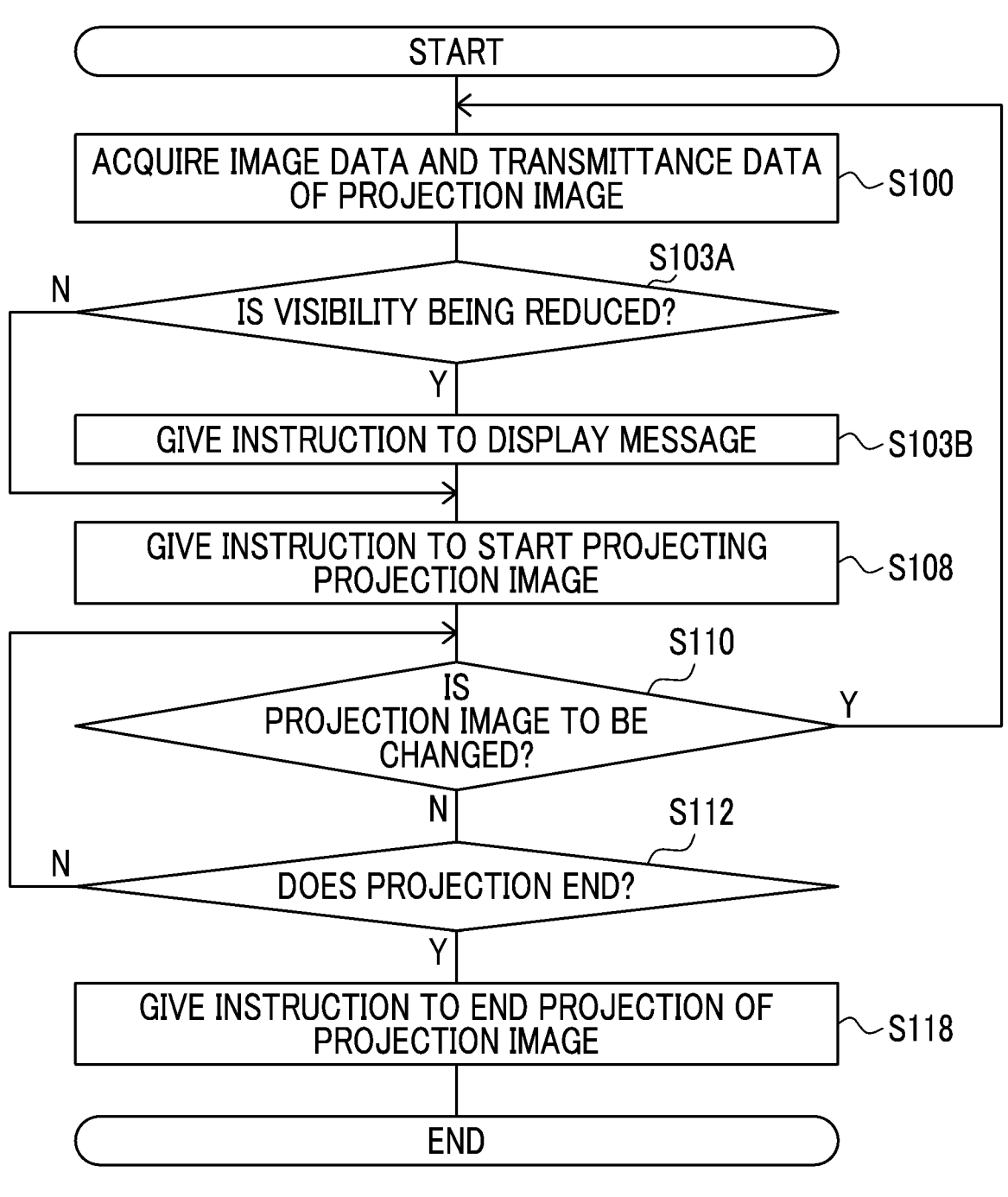
FIG. 15 is a flowchart showing an example of display control processing that is performed by a smartphone of Modification example 5.

FIG. 15 is a flowchart showing an example of display control processing that is performed by a smartphone 12 of this modification example. The display control processing shown in FIG. 15 is different from the display control processing of the above-mentioned embodiment (see FIG. 6) in that Steps S103A and S103B are provided instead of Steps S102 to S106. Further, the display control processing shown in FIG. 15 is different from the display control processing of the above-mentioned embodiment (see FIG. 6) in that Steps S114 and S116 are not provided.

In Step S103A of FIG. 15, the reduction amount determination unit 54 determines whether or not to reduce the visibility of the transmission unit 20L for a left eye on the basis of the transmittance data acquired in Step S100. In a case where the visibility is not to be reduced, the determination in Step S103A is a negative determination and the processing proceeds to Step S108. On the other hand, in a case where the visibility is to be reduced, the processing proceeds to Step S103B.

In Step S103B, the reduction controller 56 instructs the visibility reduction unit 28 to display a message that prompts the user to close the left eye. The visibility reduction unit 28 uses the OLED 26 to project the message, which prompts the user to close the left eye, onto the projection image 67. Accordingly, as shown in FIG. 14, the user can visually recognize the projection image 67, which is a message prompting the user to close the left eye, with the right eye. Therefore, the user closes the left eye to reduce visibility on the left eye side. After that, in this modification example, after the projection of the projection image is ended by the processing of Step S118, the user voluntarily opens the left eye to improve visibility on the left eye side.

An aspect in which a message prompting a user to close the left eye is displayed on the right eye side has been described in this modification example, but the present disclosure is not limited to this aspect. For example, the message may be displayed on the left eye side. Further, in a case where the projection of a desired projection image ends, a message prompting the user to open the left eye may be further displayed. Furthermore, the message prompting the user to close the left eye is not limited to an aspect in which the message is visually displayed as an image, and the message may be displayed in an audible manner by voice in a case where the smartphone 12 comprises a speaker.

Modification Example 6

An aspect in which the visibility reduction unit 28 adjusts the light shielding rate of the transmission unit 20L for a left eye to reduce the visibility of the real image has been described in the above-mentioned embodiment, but a method of reducing visibility by the visibility reduction unit 28 is not limited to this aspect. For example, the visibility reduction unit 28 may adjust the diopter of the transmission unit 20L for a left eye to reduce the visibility of a real image. In this case, for example, the visibility reduction unit 28 may be a mechanism for shifting the focus of the transmission unit 20L for a left eye, and a focus may be shifted to lower a diopter as a transmittance is lower.

Modification Example 7

An aspect in which the visibility of a real image is reduced on a side opposite to one side of the left and right eyes where a projection image is projected has been described in the above-mentioned embodiment, but the visibility of a real image may also be reduced on the side where the projection image is projected. In a case where the brightness of the real image and the brightness of the projection image are significantly different from each other on the side where the projection image is projected, it may be difficult to visually recognize the projection image. Particularly, in a case where the brightness of the real image is higher than the brightness of the projection image, it is difficult to visually recognize the projection image. Accordingly, in this modification example, the visibility of the real image on the side where the projection image is projected is also reduced in a case where the brightness of the real image is higher than the brightness of the projection image by a predetermined threshold value or more.

Figure 16:
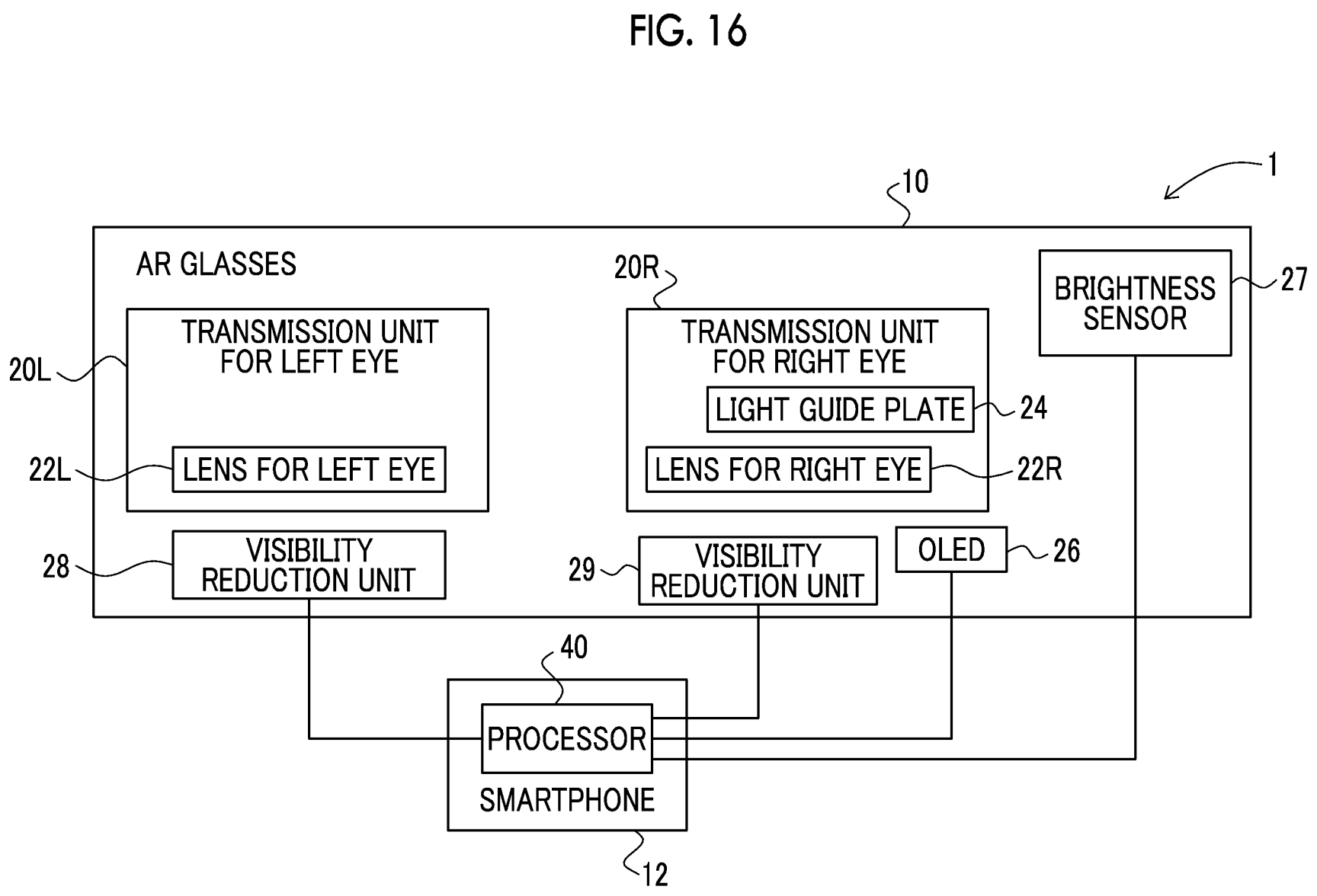

FIG. 16 is a diagram showing an example of the configuration of a glasses-type information display device 1 of this modification example. The glasses-type information display device 1 shown in FIG. 16 is different from the glasses-type information display device 1 according to the above-mentioned embodiment (see FIG. 1) in that a visibility reduction unit 29 for reducing the visibility of the transmission unit 20R for a right eye and a brightness sensor 27 for detecting the brightness of the real image are further provided.

The reduction amount determination unit 54 of this modification example determines the amount of reduction in the visibility of the transmission unit 20R for a right eye on the basis of a brightness value of the real image that is a detection result of the brightness sensor 27 and a brightness value of the projection image that is projected from the OLED 26. For example, a correspondence relationship between a difference between the brightness value of the real image and the brightness value of the projection image and the amount of reduction in visibility (the amount of light to be blocked) is obtained in advance, and the reduction amount determination unit 54 determines the amount of light to be blocked on the basis of the correspondence relationship from the brightness value of the real image obtained from the brightness sensor 27 and the brightness value of the projection image. The reduction controller 56 performs a control to cause the visibility reduction unit 28 to reduce the visibility of the transmission unit 20R for a right eye on the basis of the amount of reduction that is determined by the reduction amount determination unit 54.

Figure 17:
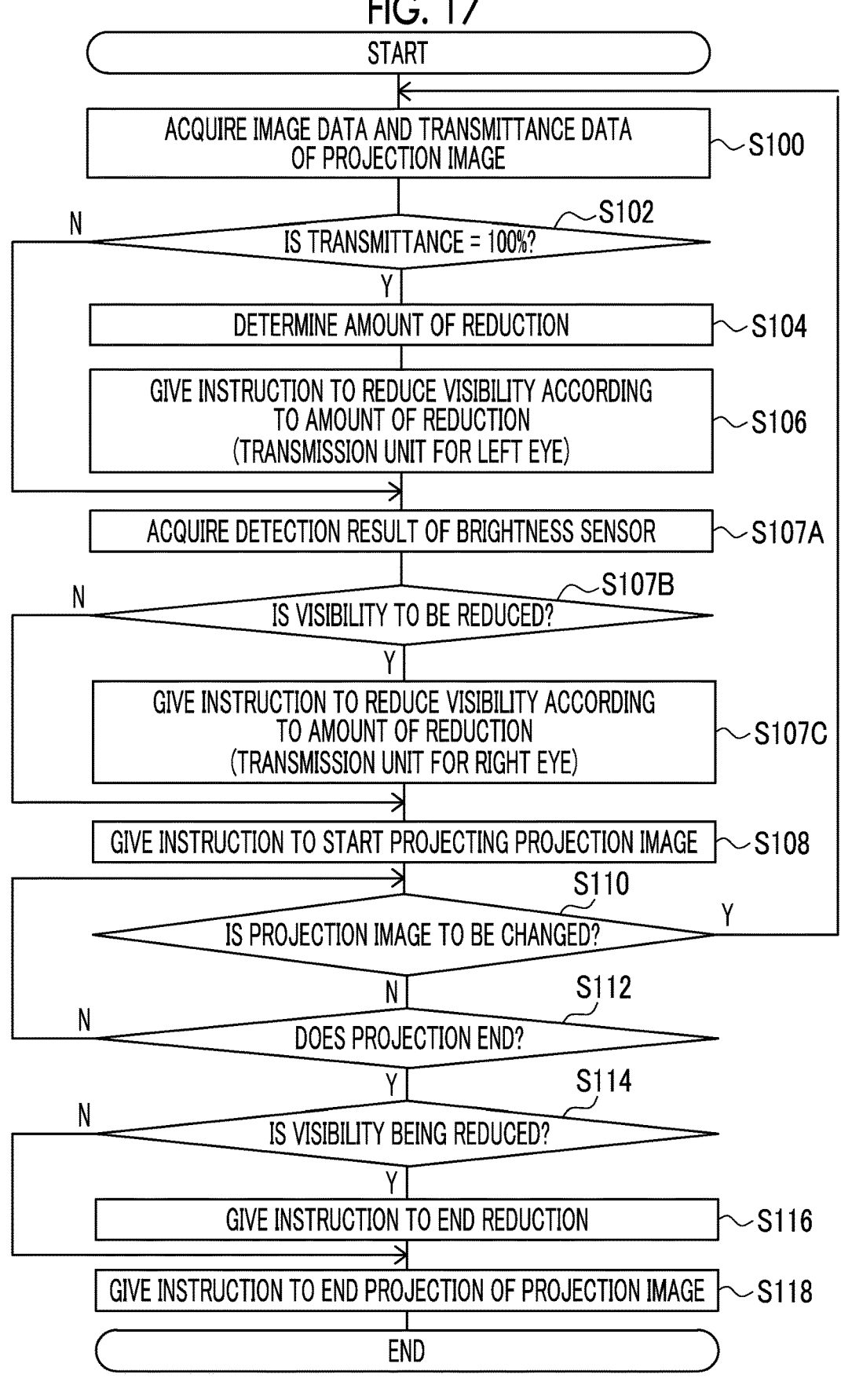
FIG. 17 is a flowchart showing an example of display control processing that is performed by a smartphone of Modification example 7.

FIG. 17 is a flowchart showing an example of display control processing that is performed by a smartphone 12 of this modification example. The display control processing shown in FIG. 17 is different from the display control processing of the above-mentioned embodiment (see FIG. 6) in that the processing of Steps S107A to S107C is provided between Steps S106 and S108.

In Step S107A, the reduction amount determination unit 54 acquires a detection result from the brightness sensor 27. As described above, the reduction amount determination unit 54 acquires the brightness value of the real image from the brightness sensor 27. In the next step S107B, the reduction amount determination unit 54 determines whether or not to reduce the visibility of the transmission unit 20R for a right eye. As described above, the reduction amount determination unit 54 determines whether or not to reduce visibility on the basis of a difference between the brightness value of the real image acquired in Step S107A and the brightness value of the projection image, and determines the amount of reduction in a case where visibility is to be reduced. In a case where visibility is not to be reduced, the determination in Step S107B is a negative determination and the processing proceeds to Step S108. On the other hand, in a case where visibility is to be reduced, the determination in Step S107B is an affirmative determination and the processing proceeds to Step S107C.

In Step S107C, the reduction controller 56 outputs an instruction to the visibility reduction unit 29 so that the visibility of the real image is reduced by the amount of reduction determined by the reduction amount determination unit 54 as described above. In a case where the instruction is input to the visibility reduction unit 29 from the smartphone 12, the visibility reduction unit 29 shields the transmission unit 20R for a right eye from light by the instructed amount of reduction and reduces the visibility of the real image.

According to this modification example, since visibility on the side where the projection image is projected can also be reduced as described above, the projection image can be easily visually recognized. A diopter may be adjusted as in Modification example 6 to reduce the visibility of the transmission unit 20R for a right eye.

As described above, the glasses-type information display device 1 according to the present embodiment comprises the transmission unit 20L for a left eye and the transmission unit 20R for a right eye, the OLED 26 that projects a projection image onto the transmission unit 20R for a right eye, the visibility reduction unit 28 that reduces the visibility of a real image visually recognized by a user through the transmission unit 20L for a left eye, and the processor 40 of the smartphone 12 that performs a control to cause the visibility reduction unit 28 to reduce visibility on the basis of a display priority given to the projection image.

As described above, according to the glasses-type information display device 1 of the present embodiment, the degree of visibility of the projection image, which corresponds to a priority given to the projection image, in the visually-recognized image finally visually recognized by a user can be made appropriate. Accordingly, according to the glasses-type information display device 1 of the present embodiment, a projected image can be visually recognized in an appropriate state.

A case where the projection image is a static image has been described in the above-mentioned embodiment, but the projection image may be a video. Further, a display priority may be changed during the display of the projection image.

An aspect in which the projection image is visually recognized with the right eye of a user has been described in the above-mentioned embodiment, but the present disclosure is not limited to this aspect. The projection image may be visually recognized with the left eye of the user. In this case, the transmission unit 20L for a left eye is an example of a first transmission unit of the present disclosure, and the transmission unit 20R for a right eye is an example of a second transmission unit of the present disclosure.

Further, the following various processors can be used in the embodiment as the hardware structures of processing units, such as the acquisition unit 50, the display controller 52, the reduction amount determination unit 54, and the reduction controller 56, which perform various types of processing. The various processors include a programmable logic device (PLD) that is a processor of which the circuit configuration can be changed after manufacture, such as a field programmable gate array (FPGA), a dedicated electrical circuit that is a processor having circuit configuration dedicatedly designed to perform specific processing, such as an application specific integrated circuit (ASIC), and the like in addition to a CPU that is a general-purpose processor functioning as various processing units by executing software (program) as described above.

One processing unit may be formed of one of these various processors, or may be formed of a combination of two or more processors of the same type or different types (for example, a combination of a plurality of FPGAs or a combination of a CPU and an FPGA). Further, a plurality of processing units may be formed of one processor.

As an example where a plurality of processing units are formed of one processor, first, there is an aspect in which one processor is formed of a combination of one or more CPUs and software as typified by a computer, such as a client or a server, and functions as a plurality of processing units. Second, there is an aspect where a processor fulfilling the functions of the entire system, which includes a plurality of processing units, by one integrated circuit (IC) chip as typified by System On Chip (SoC) or the like is used. In this way, various processing units are formed using one or more of the above-mentioned various processors as hardware structures.

In addition, more specifically, electrical circuitry where circuit elements, such as semiconductor elements, are combined can be used as the hardware structures of these various processors.

Further, an aspect in which the display control program 45 is stored (installed) in the storage unit 44 in advance has been described in each embodiment, but the present disclosure is not limited thereto. The display control program 45 may be provided in a form where the display control program 45 is recorded in recording mediums, such as a compact disc read only memory (CD-ROM), a digital versatile disc read only memory (DVD-ROM), and a universal serial bus (USB) memory. Furthermore, the display control program 45 may be downloaded from an external device through a network.

What is claimed is:

1. A glasses-type information display device comprising:
   a first transmission unit for one eye and a second transmission unit for another eye;
   a projection unit that projects an image onto the first transmission unit;
   a visibility reduction unit that reduces visibility of a real image visually recognized by a user through the second transmission unit; and
   a processor,
   wherein the processor is configured to perform a control to cause the visibility reduction unit to reduce the visibility on the basis of a display priority given to the image, and
   wherein the visibility reduction unit adjusts a diopter of the second transmission unit to reduce the visibility.

2. The glasses-type information display device according to claim 1,
   wherein the first transmission unit and the second transmission unit are disposed in front of the one eye being a right eye and the other eye being a left eye of the user in use and provide visual fields of the real image to the right eye and the left eye, respectively,
   the projection unit inserts information into the visual field of the real image, which is visually recognized by the user through the first transmission unit, in a superimposed manner, and
   the processor is configured to perform the control in a case in which the projection unit projects the image onto the first transmission unit.

3. The glasses-type information display device according to claim 1, wherein the display priority is transmittance data or depth data that represents a transmittance of the image superimposed on the real image.

4. The glasses-type information display device according to claim 1, wherein in a case in which a transmittance map representing a transmittance distribution in the image is set for the image to be projected onto the first transmission unit, the processor is configured to change an amount of reduction, by which the visibility is to be reduced in the second transmission unit, for each region on the basis of the transmittance map.

5. The glasses-type information display device according to claim 1, wherein the visibility reduction unit also adjusts a light shielding rate or a diopter of the first transmission unit.

6. A glasses-type information display device comprising:

a first transmission unit for one eye and a second transmission unit for another eye;

a projection unit that projects an image onto the first transmission unit;

a visibility reduction unit that reduces visibility of a real image visually recognized by a user through the second transmission unit; and a processor, wherein the processor is configured to perform a control to cause the visibility reduction unit to reduce the visibility on the basis of a display priority given to the image, and wherein a type of the image is given to the image as the display priority, and the type of the image is preset is at least one of an image for providing notification of danger or an image for providing a warning.

7. The glasses-type information display device according to claim 6, wherein the visibility reduction unit changes optical characteristics of the second transmission unit to reduce the visibility of the real image.

8. The glasses-type information display device according to claim 7, wherein the processor is configured to determine an amount of reduction by which the visibility reduction unit is to reduce the visibility according to the display priority.

9. The glasses-type information display device according to claim 7, wherein the visibility reduction unit changes the optical characteristics of a region of the second transmission unit that corresponds to a region of the first transmission unit onto which the image is projected.

10. The glasses-type information display device according to claim 7, wherein the visibility reduction unit adjusts a light shielding rate of the second transmission unit to reduce the visibility.

11. The glasses-type information display device according to claim 10, wherein the visibility reduction unit is a liquid crystal shutter, electrochromism, or a variable neutral density (ND) filter.

12. The glasses-type information display device according to claim 7, wherein the visibility reduction unit adjusts a diopter of the second transmission unit to reduce the visibility.

13. The glasses-type information display device according to claim 12, wherein the visibility reduction unit is a mechanism that shifts a focus of the second transmission unit.

14. A glasses-type information display device comprising:

a first transmission unit for one eye and a second transmission unit for another eye;

a projection unit that projects an image onto the first transmission unit;

a visibility reduction unit that reduces visibility of a real image visually recognized by a user though the second transmission unit; and a processor, wherein the processor is configured to perform a control to cause the visibility reduction unit to reduce the visibility on the basis of a display priority given to the image, and wherein the visibility reduction unit is a message display unit that displays a message prompting the user to close the another eye, which corresponds to the second transmission unit, of the right eye and the left eye.

15. The glasses-type information display device according to claim 14, wherein the visibility reduction unit displays a message, which prompts the user to close the right eye, on at least one of the first transmission unit or the second transmission unit in a case in which the eye corresponding to the second transmission unit is the right eye, and displays a message, which prompts the user to close the left eye, on at least one of the first transmission unit or the second transmission unit in a case in which the eye corresponding to the second transmission unit is the left eye.

\* \* \* \* \*